(12) United States Patent
Seelman et al.

(10) Patent No.: US 11,621,867 B2
(45) Date of Patent: *Apr. 4, 2023

(54) METHOD AND APPARATUS FOR NETWORK DEVICE DETECTION

(71) Applicant: ECOLINK INTELLIGENT TECHNOLOGY, INC., Carlsbad, CA (US)

(72) Inventors: George Seelman, Temecula, CA (US); Michael Lamb, Rancho Santa Fe, CA (US); Michael Bailey, Carlsbad, CA (US); Jay Stone, San Marcos, CA (US)

(73) Assignee: ECOLINK INTELLIGENT TECHNOLOGY, INC., Carlsbad, CA (US)

( * ) Notice: Subject to any disclaimer, the term of this patent is extended or adjusted under 35 U.S.C. 154(b) by 1275 days.

This patent is subject to a terminal disclaimer.

(21) Appl. No.: 15/864,926

(22) Filed: Jan. 8, 2018

(65) Prior Publication Data
US 2018/0131534 A1 May 10, 2018

Related U.S. Application Data

(60) Division of application No. 13/273,092, filed on Oct. 13, 2011, now Pat. No. 9,882,734, which is a
(Continued)

(51) Int. Cl.
*H04L 12/28* (2006.01)
(52) U.S. Cl.
CPC ............................... *H04L 12/2809* (2013.01)
(58) Field of Classification Search
None
See application file for complete search history.

(56) References Cited

U.S. PATENT DOCUMENTS

| 4,176,395 A | | 11/1979 | Evelyn-Veere et al. |
| 4,755,792 A | * | 7/1988 | Pezzolo ............. G08B 13/1418 340/538.17 |

(Continued)

OTHER PUBLICATIONS

U.S. Patent and Trademark Office, Final Office Action issued in U.S. Appl. No. 13/332,812, dated Jan. 25, 2019, 20 pgs.
(Continued)

*Primary Examiner* — Backhean Tiv
(74) *Attorney, Agent, or Firm* — Greenberg Traurig, LLP

(57) ABSTRACT

A method and apparatus for detecting remote network devices. In one embodiment, the method comprises detecting an event and a) transmitting a message requesting a response from one or more remote network devices, the message comprising a first network identification code, and b) determining whether a response to the message has been received, the response transmitted by a remote network device after receiving the message and determining that the first network identification code matches a second network identification code stored within the remote network device, the response comprising identification information of the remote network device. If c) a response has not been received, terminating the method for detecting remote network devices if a pre-determined time period has elapsed since transmitting the message. If d) a response has been received, storing identification information associated with the responding remote network device and repeating steps a-d until no further responses are received.

14 Claims, 11 Drawing Sheets

Related U.S. Application Data continuation-in-part of application No. 13/214,116, filed on Aug. 19, 2011, now Pat. No. 8,619,819.

(56) References Cited

U.S. PATENT DOCUMENTS

| | | | | |
|---|---|---|---|---|
| 5,150,464 A * | 9/1992 | Sidhu | H04L 9/40 | 709/228 |
| 5,491,463 A * | 2/1996 | Sargeant | H04B 3/542 | 340/310.11 |
| 5,854,901 A | 12/1998 | Cole et al. | | |
| 5,978,371 A * | 11/1999 | Mason, Jr. | H04L 12/40032 | 370/279 |
| 6,118,768 A * | 9/2000 | Bhatia | H04Q 11/0471 | 370/254 |
| 6,343,320 B1 * | 1/2002 | Fairchild | H04L 41/0213 | 709/224 |
| 6,587,739 B1 * | 7/2003 | Abrams | G05B 15/02 | 7/110 |
| 6,688,535 B2 | 2/2004 | Collins | | |
| 6,754,750 B2 | 6/2004 | Davies | | |
| 6,934,876 B1 * | 8/2005 | Holeman, Sr. | H04L 61/5038 | 714/4.12 |
| 6,938,834 B2 | 9/2005 | Harris | | |
| 6,970,072 B1 | 11/2005 | Cregg et al. | | |
| 7,069,115 B1 | 6/2006 | Woytowitz | | |
| 7,181,319 B1 | 2/2007 | Woytowitz | | |
| 7,272,690 B2 | 9/2007 | Groves et al. | | |
| 7,345,998 B2 | 3/2008 | Cregg et al. | | |
| 7,358,626 B2 | 4/2008 | Gardner et al. | | |
| 7,359,704 B1 * | 4/2008 | Dizdarevic | H04W 8/28 | 455/433 |
| 7,467,099 B2 * | 12/2008 | Kamada | G06Q 20/24 | 705/64 |
| 7,562,832 B1 | 7/2009 | Anderson | | |
| 7,619,322 B2 | 11/2009 | Gardner et al. | | |
| 7,653,352 B2 | 1/2010 | Murphy | | |
| 7,683,504 B2 | 3/2010 | Blair et al. | | |
| 7,826,931 B2 | 11/2010 | Lorenz | | |
| 7,853,662 B2 * | 12/2010 | Ha | H04L 41/00 | 709/227 |
| 7,903,670 B2 * | 3/2011 | Ha | H04L 43/00 | 370/465 |
| 8,090,807 B2 * | 1/2012 | Chung | H04L 12/2807 | 709/219 |
| 8,116,203 B2 * | 2/2012 | Kadambi | H04L 47/30 | 370/231 |
| 8,254,377 B1 * | 8/2012 | Kosar | H04W 4/50 | 370/352 |
| 8,458,307 B2 * | 6/2013 | Seelman | H04B 3/542 | 709/221 |
| 8,755,913 B2 * | 6/2014 | McCormack | H04L 12/282 | 700/19 |
| 8,989,779 B1 * | 3/2015 | Centore, III | H04W 4/021 | 455/456.2 |
| 9,054,892 B2 * | 6/2015 | Lamb | H04L 12/462 | |
| 9,438,443 B2 * | 9/2016 | Lamb | H04L 12/462 | |
| 9,882,734 B2 * | 1/2018 | Seelman | H04L 12/2809 | |
| 2002/0011923 A1 * | 1/2002 | Cunningham | H04B 3/542 | 340/12.32 |
| 2003/0055923 A1 | 3/2003 | Kim et al. | | |
| 2003/0093484 A1 | 5/2003 | Petite | | |
| 2004/0172531 A1 * | 9/2004 | Little | H04L 63/0823 | 713/155 |
| 2004/0267964 A1 * | 12/2004 | Ha | H04L 61/5046 | 709/236 |
| 2005/0198370 A1 * | 9/2005 | Miller | H04L 63/0428 | 709/238 |
| 2006/0106918 A1 | 5/2006 | Evert et al. | | |
| 2006/0126617 A1 | 6/2006 | Cregg et al. | | |
| 2006/0158343 A1 | 7/2006 | Lee et al. | | |
| 2006/0238372 A1 * | 10/2006 | Jung | H04N 21/4882 | 340/12.29 |
| 2007/0146127 A1 * | 6/2007 | Stilp | G08B 1/08 | 340/539.1 |
| 2007/0149122 A1 | 6/2007 | Murphy | | |
| 2007/0150616 A1 * | 6/2007 | Baek | H04L 12/2803 | 709/246 |
| 2007/0245033 A1 * | 10/2007 | Gavrilescu | H04L 43/12 | 709/230 |
| 2008/0051083 A1 * | 2/2008 | Madej | H04W 8/02 | 455/435.1 |
| 2008/0147776 A1 * | 6/2008 | Inoue | H04L 63/0236 | 709/202 |
| 2008/0169904 A1 * | 7/2008 | Schulman | B60R 25/00 | 340/7.22 |
| 2008/0294736 A1 * | 11/2008 | Shaw | G06Q 10/107 | 707/999.005 |
| 2009/0006600 A1 | 1/2009 | Siegmund | | |
| 2009/0215424 A1 | 8/2009 | Petite | | |
| 2010/0106322 A1 * | 4/2010 | Grohman | H04L 12/66 | 709/206 |
| 2010/0164693 A1 * | 7/2010 | Zhang | H04L 63/0823 | 340/10.31 |
| 2010/0268392 A1 | 10/2010 | Korol et al. | | |
| 2011/0167154 A1 | 7/2011 | Bush et al. | | |
| 2011/0282979 A1 * | 11/2011 | Bower, III | H04L 61/5061 | 709/222 |
| 2013/0044630 A1 * | 2/2013 | Seelman | H04L 12/2809 | 370/254 |
| 2013/0044767 A1 * | 2/2013 | Seelman | H04L 12/2807 | 370/474 |
| 2013/0046867 A1 * | 2/2013 | Seelman | H04L 12/2807 | 709/221 |
| 2013/0046872 A1 * | 2/2013 | Seelman | H04B 3/542 | 709/223 |
| 2013/0046881 A1 * | 2/2013 | Seelman | H04L 12/2809 | 709/224 |
| 2013/0215902 A1 * | 8/2013 | Lamb | H04L 12/462 | 370/401 |
| 2014/0066062 A1 * | 3/2014 | Chen | H04W 60/00 | 455/435.1 |
| 2015/0270984 A1 * | 9/2015 | Lamb | H04L 12/2836 | 370/401 |
| 2018/0131534 A1 * | 5/2018 | Seelman | H04L 12/2809 | |

OTHER PUBLICATIONS

Think Like A Computer. (Aug. 24, 2011). How IP Routing Works. Retrieved from https://www.think-like-a-computer.com/2011/08/24/ip-routing/, 14 pgs.

"The X10 Powerhouse Power Line Interface Model #PL513 and Two-Way Power Line Interference Model #TW523", Revision 2.4, by Dave Rye of X10 Inc., 91 Ruckman Rd., Box 420, Closter, New Jersey 07647-0420, 12 pgs., Published 1991.

"Insteon The Details", Aug. 11, 2005, by Smarthome Technology, 16542 Millikan Ave., Irvine, CA, 92606-5027, 68 pgs.

S. Cheshire, RFC 5227—IPv4 Address Conflict Detection, Jul. 2008, pp. 1-21.

U.S. Patent and Trademark Office, Non-Final Office Action issued in U.S. Appl. No. 13/332,812, dated Feb. 25, 2020, 23 pgs.

U.S. Patent and Trademark Office, Final Office Action issued in U.S. Appl. No. 13/332,812, dated Sep. 9, 2020, 25 pgs.

* cited by examiner

METHOD AND APPARATUS FOR NETWORK DEVICE DETECTION

CROSS-REFERENCE TO RELATED APPLICATIONS

This application is a divisional of U.S. patent application Ser. No. 13/273,092, filed on Oct. 13, 2011, which is a continuation-in-part of U.S. patent application Ser. No. 13/214,116, filed on Aug. 19, 2011, now U.S. Pat. No. 8,619,819.

BACKGROUND

Field of Use

The present application relates to the field of remote management and control of electric or electro-mechanical devices. More specifically, the present application relates to a method and apparatus for network device detection in home networks.

Description of the Related Art

Network technology has proliferated over the years, thanks to the ubiquitous nature of the Internet. Millions of home and business networks have been set up to access network resources, such as printers, computers, and other peripheral devices on the network. Such networks typically rely on a router and one or more remote network devices each possessing the necessary hardware, software, and/or firmware to enable communications to the router.

The most familiar type of routers are home and small office routers that simply pass data, such as web pages and email, between the home computers and the owner's cable or DSL modem, which connects to the Internet (ISP). However more sophisticated routers range from enterprise routers, which connect large business or ISP networks up to the powerful core routers that forward data at high speed along the optical fiber lines of the Internet backbone.

When a new network is set up, a router is generally installed first. They are typically programmed during the manufacturing process to include a pre-assigned IP address, the most commonly one used today being 192.168.1.1. Wireless routers are additionally pre-programmed with a service-set identifier (SSID) that uniquely identifies the router and, thus, a particular local-area network (LAN). Users must generally change the default SSID to avoid interference with other wireless routers that may be operating nearby.

After a router has been set up, peripheral devices may then be connected to it. In the case of a wireless network, peripheral devices must generally detect the SSID and often be supplied with a password if data signals from the router are encrypted. Users of the network must generally have some knowledge of how to connect their peripheral devices wirelessly to the router.

In some networks, hardware may not take the form of the typical router and peripheral devices. This may be the case, for example, with custom automated outdoor home lighting systems. In this case, the router may take the form of a central control device and peripheral devices may take the form of a slave controller device that is able to communicate wirelessly with the central control device. In these custom networks, traditional ways of slave setup may be non-existent. However, it is still imperative that the central control device detect slave devices in the network.

Thus, it would be desirable to provide a method and apparatus for automatically detecting slave devices in a network.

SUMMARY

A method and apparatus for detecting remote network devices in a network is described. In one embodiment, a method for detecting remote network devices comprises detecting an event and, in response to detecting the event, a) transmitting a message requesting a response from one or more remote network devices, the message comprising a first network identification code, and b) determining whether a response to the message has been received, the response transmitted by a remote network device after receiving the message and determining that the first network identification code matches a second network identification code stored within the remote network device, the response comprising identification information of the remote network device. If c) a response has not been received, terminating the method for detecting remote network devices if a pre-determined time period has elapsed since transmitting the message. If d) a response has been received, storing identification information associated with the responding remote network device and repeating steps a-d until no further responses are received.

In another embodiment, an apparatus for detecting remote network devices in a network comprises a memory for storing a first network identification code and identification information of any detected remote devices, a transmitter for transmitting messages, and a receiver for receiving messages. The apparatus further comprises a processor for detecting an event and in response to detecting the event, a) causing a transmitter to transmit a message requesting a response from one or more remote network devices, the message comprising the first network identification code and b) determining whether a response to the message has been received, the response transmitted by a remote network device after receiving the message and determining that the first network identification code matches a second network identification code stored within the remote network device, the response comprising identification information of the remote network device. If c) a response has not been received, terminating the detection of remote network devices if a pre-determined time period has elapsed since transmitting the message. If d) a response has been received, storing identification information associated with the responding remote network device and repeating steps a-d until no further responses are received.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present description relates to methods and apparatus for providing robust communications between devices in a network. It should be understood that in some embodiments, the hardware described below may be designed and manufactured in compliance with one or more governmental regulations that restrict operation of such devices. For example, in one embodiment, the hardware is designed to meet the requirements of 47 C.F.R. Part 95, a United States regulation promulgated by the Federal Communications Commission. In another embodiment, the hardware is designed to meet the requirements of 47 C.F.R. Part 15.

Figure 1:
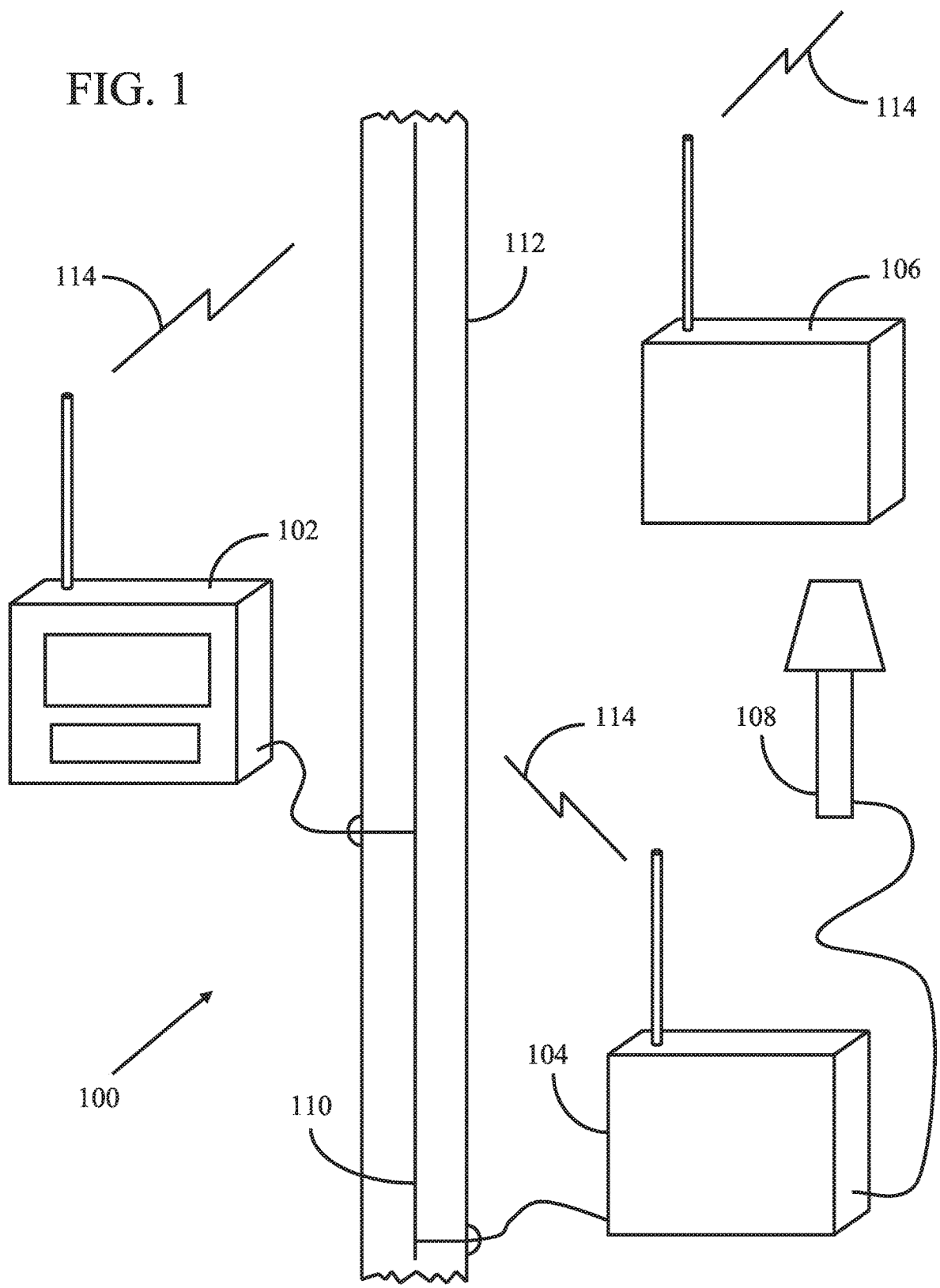
FIG. 1 illustrates a network comprising two communication channels, a network control device and two remote network devices.

FIG. 1 illustrates a network 100, which comprises a network control device 102, wired remote network device 104, wireless remote network device 106, controlled electric device 108, powerline 110 disposed within wall 112, and wireless communication channel 114. It should be understood that network 100 may comprise any number of other configurations, including configurations having a greater, or fewer, number and type of network devices and controlled electric devices. Each of the network devices, i.e., network control device 102, wired remote network device 104, and wireless remote network device 106, is typically located many feet away from each other in proximity. For example, network control device 102 could be located in a kitchen, while wired remote network device 104 could be located outdoors, and wireless remote network device 106 located in a bedroom.

In one embodiment, network 100 is used by consumers to provide networked command and control to household electric devices, such as indoor or outdoor lighting, water pumps (i.e., pumps for pools, Jacuzzis, fountains, etc.), security devices, garage door openers, heating and air conditioning systems (including thermostats, fans, electric and gas central heaters, portable heaters and air conditioners, appliances, communication devices, computers, video and still cameras, and other types of equipment. In other embodiments, network 100 can be configured to provide networked command and control to larger entities, such as businesses, apartment buildings, sporting venues, etc.

Each of the network devices (i.e., network control device 102, wired remote network device 104, and wireless remote network device 106) in FIG. 1 is generally able to communicate with each other, either uni-directionally bi-directionally. For example, in one embodiment, network control device 102 may transmit commands to wired remote network device 104 and wireless remote network device 106 only. In another embodiment, network control device 102 may transmit commands to wired remote network device 104 and wired remote network device 104 may be able to transmit status or acknowledgements back to network control device 102, while wireless remote network device 106 remains able to only receive commands sent by network control device 102. Thus, any combination of one-way or bi-directional communications are possible among devices in network 100.

Communications among the network devices may be transmitted over-the-air using one or more well-known wireless communication techniques or they may be transmitted using powerline 110, typically comprising pre-existing high-power commonly found in homes, offices, businesses. In another embodiment, messages are transmitted over both communication channels, i.e., via both over-the-air communication channel 114 and powerline 110, either simultaneously or in a time-multiplexed fashion. Thus, each device in network 100 may comprise circuitry to transmit and/or receive information using RF circuitry, powerline circuitry, or both. In addition, devices may be configured to only receive information, to only transmit information, to only receive information using powerline technology, to only receive using RF technology, to only transmit information using powerline technology, to only transmit using RF technology, to transmit information using both powerline and RF technology, or any combination thereof.

Transmitting information over powerline 110 generally results in wireless propagation of such information along the length of powerline 110. This wireless propagation may be received by devices in network 100 equipped to receive only wireless transmissions although, generally, such a device must be located relatively close to powerline 110, since the level of electro-magnetic radiation may be limited by one or more governmental authorities.

Powerline 110 typically comprises a two or three-wire bundle of conductors. For example, in a three-wire scheme, one conductor carries 110 volts AC (commonly referred to as "hot"), one conductor acts as a return, or neutral, and one conductor acts as a safety ground. In two-wire embodiments, generally only the "hot" and neutral wires are found. Thus, transmitting communication signals over powerline 110 provides a readily-accessible communication channel throughout homes and businesses over which to send communications.

In the embodiment shown in FIG. 1, network control device 102 comprises a central control device that sends messages to other network devices, such as wired remote network device 104 and wireless remote network device 106. The messages may comprise commands that instruct other network devices to perform various actions, such as provide or remove power to one or more electric devices 108, such as indoor or outdoor lighting, pumps, and security devices, or to control operation of devices, such as to pan or zoom a security camera, dim lights to a certain level, change the watering time and/or duration of sprinklers, as well as other actions that will be discussed later herein. Network control device 102 typically comprises a user interface comprising an electronic display and means for entering commands/information, such as a keypad, microphone, touchpad, or any other well-known device for entering commands or information into network control device 102.

Commands may also comprise queries, instructing remote network devices to provide information to a requesting device, such as identification information (i.e., a serial number or house code), a location of the device, a status of the device or electric device 108 associated with the device, etc. In one embodiment, such information is transmitted in messages referred to as responses.

In another embodiment, one or more of the network devices shown in FIG. 1 may not be configured to receive commands from network control device 102. In this case, information is simply transmitted from such a device at predetermined time intervals or upon the occurrence of a predetermined event, or a combination of both. For example, wireless remote network device 106 might comprise a wireless thermometer that transmits a reading of the ambient air temperature to network control device 102 every 15 minutes or when a sudden increase in ambient temperature is detected. In the embodiment shown in FIG. 1, neither wired remote network device 104 nor wireless remote network device 106 comprise a user interface; they are controlled and operate without direct user input. In other embodiments, network devices may comprise a user interface or other interfaces, such as a telephone interface, a serial port, a parallel port, an Ethernet interface, a USB interface, or any other interface that allows information to be sent to, or from, network devices.

Wired remote network device 104 and wireless remote network device 106 may comprise (or be incorporated into) a variety of devices, such as an electric switch (i.e., for controlling 110 VAC to various devices), a light, a thermometer, a thermostat, a video camera, a still camera, a microphone, a water pump, a water heater, household appliances such as refrigerators, freezers, ovens, microwave ovens, washers, dryers, solar energy systems, or virtually any type of energy-consuming device.

Figure 2:
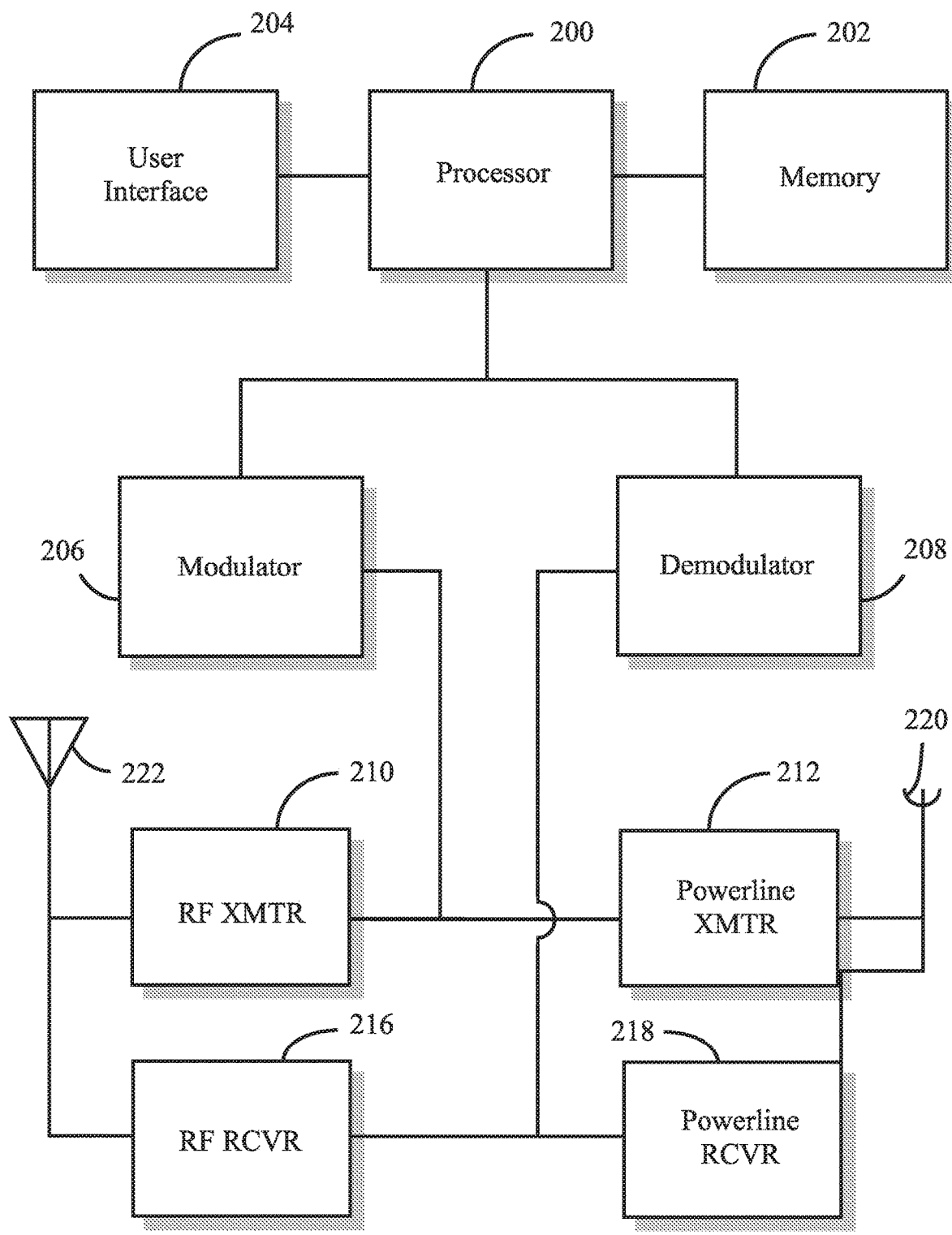
FIG. 2 is a functional block diagram of one embodiment of the network control device of FIG. 1.

FIG. 2 is a functional block diagram of one embodiment of network control device 102, shown as a having a user interface and multiple transmitters and receivers. Specifically, FIG. 2 shows processor 200, memory 202, user interface 204, modulator 206, demodulator 208, RF transmitter 210, powerline transmitter 212, interface 214, RF receiver 216, powerline receiver 218, wiring assembly 220, and wiring assembly 222. It should be understood that not all of the functional blocks shown in FIG. 2 are required for operation of network control device 102 (for example, interface 214 might not be used, only one type of transmitter may be present, only one type of receiver may be present, etc.), that the functional blocks may be connected to one another in a variety of ways, and that not all functional blocks necessary for operation of network control device 102 are shown (such as a power supply) for purposes of clarity. It should also be understood that each device in network 100 may comprise certain core functionality blocks shown in FIG. 2, such as processor 200, memory 202, modulator 206 (for devices capable of transmission), demodulator 208 (for devices capable of reception), at least one type of transmitter (for devices capable of transmission), and at least one type of receiver (for devices capable of reception).

Processor 200 is configured to provide general operation of network control device 102 by executing processor-readable instructions stored in memory 202, for example, executable code. Processor 200 is typically a general purpose processor, such as a PIC16F1938 microcontroller manufactured by Microchip, Inc. of Chandler, Ariz.

Memory 202 comprises one or more information storage devices, such as RAM, ROM, EEPROM, UVPROM, flash memory, CD, DVD, Memory Stick, SD memory, XD memory, thumb drive, or virtually any other type of memory device. Memory 202 is used to store the processor-readable instructions for operation of network control device 102 as well as any information used by processor 200, such as data packet structure format, information received from other network devices, device parameter information, device identification information, device status information, etc. One of the primary functions of processor 200 is to encode commands and information into data packets for transmission to other network devices and to decode data packets received from those devices, as will be explained in greater detail later herein.

User interface 204 is coupled to processor 200 and allows a user to control operation of network control device 102, provide commands and instructions to network control device 102, and receive information from network control device 102. User interface 204 typically comprises an electronic display and means for inputting information into network control device 102. For example, the electronic display could comprise one or more seven-segment displays, a cathode ray tube (CRT), a liquid crystal display (LCD), a light emitting diode display (LEDD), one or more light emitting diodes (LEDs), light arrays, or any other type of visual display. Further, the electronic display could comprise an audio device, such as a speaker, for audible presentation of information to a user. Of course, the aforementioned items could be used alone or in combination with each other and other devices may be alternatively, or additionally, used.

User interface 204 typically comprises means for entering information into network control device 102, such as a keypad, keyboard, microphone, etc. Of course, the means for entering information could be incorporated into the display device, such as the case in a touchscreen device.

Modulator 206 is used to modulate data packets received from processor 200 for transmission to remote network devices. In one embodiment, modulator 206 comprises circuitry necessary to modulate information in accordance with any single-carrier modulation technique, such as any variation of frequency-shift keying (FSK), amplitude modulation (AM), or phase-shift keying (PSK). However, other modulation techniques could be used in in the alternative, such as spread-spectrum techniques.

Demodulator 208 is used in applications where it is desirable to receive messages from network devices. In one embodiment, demodulator 208 comprises circuitry necessary to demodulate information encoded using a single-carrier modulation technique, such as the aforementioned frequency-shift keying (FSK), amplitude modulation (AM), or phase-shift keying (PSK). Other demodulation techniques could be used in the alternative.

Network control device 102 may additionally comprise interface 214 for allowing network control device 102 to communicate with other remote devices, such as a mobile telephone, portable or fixed computer, remote control, and/or other devices. As such, interface 214 comprises circuitry in accordance with the selected interface technology, such as Bluetooth, infrared, RF, Ethernet, wireless telephone protocols such as WIMAX, LTE, CDMA, GSM, and others. Interface 214 is coupled to processor 200 to provide received information to processor 200 and to send information from processor 200 to one or more remote devices. For example, interface 214 could be used to receive commands, instructions, and/or information from a home owner, home occupant, or other interested party to network control device 102 with regard to programming and/or control of network control device 102, wired remote network device 104, and/or wireless remote network device 106.

The modulated data packets from modulator 206 is provided to at least one transmitter. In the embodiment shown in FIG. 2, the information is provided to two transmitters, RF transmitter 210 and powerline transmitter 212. In this embodiment, both transmitters are used to send information redundantly to remote devices in the network, generally simultaneously, although it may be transmitted at different times in other embodiments.

The transmitters are typically controlled by processor 200. In one embodiment, processor 200 instructs the transmitters to re-transmit the modulated data packets a number of times to increase the chance of successful reception.

RF transmitter 210 receives modulated information from modulator 206, comprising data packets for transmission to one or more remote devices. The information may comprise commands, instructions, data, acknowledgments, or any other type of information. In some cases, the amount and/or type of information may be limited by one or more governmental regulations, statues, or other restrictions.

In one embodiment, RF transmitter comprises circuitry necessary to upconvert the modulated information to a desired carrier frequency for wireless transmission to one or more network devices via antenna 222. Such circuitry is well known in the art. In other embodiments, RF transmitter 210 comprises circuitry well-known in the art for transmitting the information in accordance with other well-known transmission techniques, such as spread-spectrum techniques.

In one embodiment, RF transmitter 210 transmits the modulated, upconverted data packets at a relatively high power level for consumer devices, up to approximately 4 watts. Prior-art consumer transmitters typically transmit at very low power levels, to satisfy section 15 of the United States' Federal Communications Commission, more formally known as Title 47 Code of Federal Regulations Part 15. Part 15 is a common testing standard for most electronic equipment sold in the United States, and covers the regulations under which an intentional, unintentional, or incidental radiator can operate without an individual license. Maximum transmission power under Part 15 is generally limited to 10 milliWatts. However, under Title 47 C.F.R. Part 95 ("Personal Radio Service"), transmitters can operate at up to 50 watts of power, thus allowing for a much greater signal coverage area and eliminating the need for costly repeaters, or having to settle for spotty and unreliable signal reception. The tradeoff for allowing such high transmission power is that the emission bandwidth is limited to only tens of kilohertz, typically between 4 and 25 kHz. For example, Part 95.633(b) limits the bandwidth for any emission type to 8 kHz. Part 95 additionally comprises other restrictions, such as the types of messages that may be transmitted, the type of information that may be transmitted, and other limitations. In an embodiment where RF transmitter 210 is designed to comply with Part 95, a high transmission power may be achieved, but generally at the expense of a limited transmission bandwidth and potentially other restrictions. In other embodiments, RF transmitter 210 may be designed to comply with Part 15, or some other FCC requirement. In yet other embodiments, RF transmitter 210 may be designed without regard to FCC requirements if, for example, an associated network device is manufactured and/or sold in a country outside the United States. Most developed nations, however, impose some sort of requirements for wireless transmission.

Powerline transmitter 212 also receives the same modulated information from modulator 206 and sends the modulated information to remote devices via powerline 110. The information may comprise commands, instructions, data, acknowledgments, or any other type of information. Modulated information is received, upconverted, and coupled to powerline 110 typically using one or more transformers, capacitors, diodes, inductors, and/or other well-known components.

Although the process of upconverting the modulated information has been described as occurring independently within functional blocks 210 and 212, it may occur in a circuit that is common to both functional blocks.

RF receiver 216 receives upconverted, modulated information sent by remote devices via antenna 222. The information may comprise commands, instructions, data, acknowledgments, or any other type of information. Again, in some embodiments, the amount and/or type of information may be limited by one or more governmental regulations, statues, or other restrictions. In one embodiment, RF receiver 216 comprises circuitry well-known in the art for downconverting received RF signals and providing the resulting downconverted signal to demodulator 108. In other embodiments, RF receiver 216 comprises circuitry well-known in the art for receiving information in accordance with other well-known techniques, such as spread-spectrum signal reception.

Powerline receiver 218 generally receives the same upconverted, modulated information received by RF receiver 216, sent by remote devices via a direct connection to powerline 110. RF receiver 218 receives these signals via wiring assembly 220 connected to powerline 110. Wiring assembly 220 typically comprises two or three insulated conductors and a plug for physically connecting the powerline 110 to powerline receiver 218. Typically, powerline transmitter 212 and powerline receiver 218 each use wiring assembly 220, because powerline receivers and transmitters are typically co-located, making a second wiring assembly redundant and unnecessary. In one embodiment, the upconverted, modulated information received by powerline receiver 218 is downconverted into a baseband signal, resulting in modulated information (i.e., data packets) that is provided to demodulator 208. Powerline receiver 218 comprises well-known circuitry, such as one or more transformers, capacitors, diodes, inductors, and/or other well-known components, to downconvert the signals received over powerline 110.

In one embodiment, modulated data packets are provided to both RF transmitter 210 and powerline transmitter 212 for simultaneous transmission to one or more remote devices. In other embodiments, the modulated data packets are transmitted to one or more remote devices using either RF transmitter 210 or powerline transmitter 212.

Figure 3:
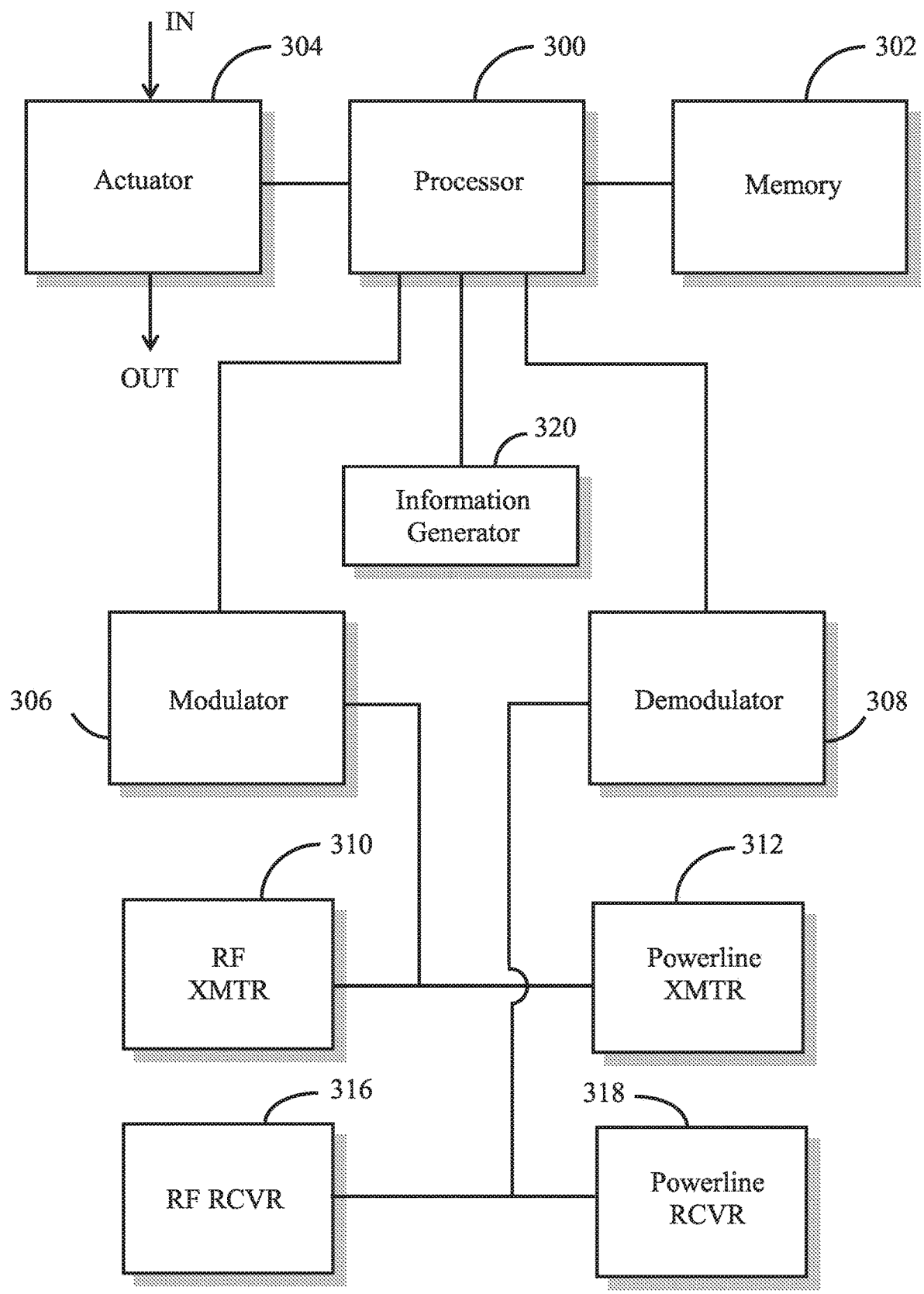
FIG. 3 is a functional block diagram representing one embodiment of one or both remote network devices shown in FIG. 1.

FIG. 3 is a functional block diagram representing one embodiment of a remote network device 301, such as wired remote network device 104 or wireless remote network device 106, having bi-directional communications capability and actuator 304 for controlling an electric or electromechanical device. Shown are processor 300, memory 302, actuator 304, modulator 306, demodulator 308, RF transmitter 310, powerline transmitter 312, RF receiver 316, and powerline receiver 318. It should be understood that not all of the functional blocks shown in FIG. 3 are required for operation of remote network device 301 (for example, only one type of transmitter may be present, only one type of receiver may be present, modulator 306, RF transmitter 310, and powerline transmitter 312 may not be present (in an embodiment where remote network device 301 lacks transmission capability), etc.). It should also be understood that the functional blocks shown in FIG. 3 may be connected to one another in a variety of ways, and that not all functional blocks necessary for operation of remote network device 301 are shown (such as a power supply, or wiring assembly (ies) related to powerline transmitter 312 and/or powerline receiver 318) for purposes of clarity.

Processor 300, memory 302, modulator 306, demodulator 308, RF transmitter 310, powerline transmitter 312, RF receiver 316, and powerline receiver 318 have all been discussed previously with respect to FIG. 2 and their description applies directly to the components in FIG. 3. Thus, a discussion of their functionality and structure will not be repeated.

However, remote network device 301 typically comprises actuator 304. Actuator 304 typically comprises a switch that is used to control power to one or more lights, transformers, pumps, motors, and other electric devices. In other embodiments, actuator 304 comprises one of a variety of other possible devices, such as a rheostat, a voltage-controlled oscillator (VCO), a variable capacitor, a motor, or any other device that can be controlled by signals from processor 300. Actuator 304 typically receives a 110 VAC signal as an input and switchably provides the 110 VAC signal to its output, where it is used to power an electric device. Control of actuator 304 is provided by one or more signals from processor 300. For example, in an embodiment where actuator 304 comprises a switch, a signal can be sent from processor 300 instructing actuator 304 to connect the 110 VAC on its input to its output. In another embodiment where actuator 304 comprises a rheostat, a signal from processor 300 may be used to alter the resistance between the input and the output of actuator 304, thereby causing an output voltage to vary in accordance with the signal from processor 300.

In another embodiment, remote network device 301 comprises information source 320. Information source 320 comprises any device for providing information to processor 300, such as a thermometer, a sill or motion picture camera, a transducer of any sort, a pressure gauge, an encoder for determining a position of an object or mechanism, a tachometer, a flow sensor, or other data measurement and/or reporting device. In another embodiment, information source 320 comprises a device separate and distinct from remote network device 301, whereby information source 320 provides information to processor 300 via wired or wireless means that is well-known in the art. Information source 320 may provide information to processor 300 at regular, or irregular time intervals, upon the occurrence of a predetermined event (such as a threshold condition being reached, i.e., an alarm condition), or when queried by processor 300. The query from processor 300 may be the result of network control device 102 or another remote network device requesting information from information source 320. The information from information source 320 is received by processor 300, where it is typically encoded into a data packet for transmission to network control device 102 and/or other remote network devices. In one embodiment, the information from information generator 320 is compared to one or more predetermined thresholds and only transmitted if the information represents a condition that exceeds the threshold. In another embodiment, information provided by information source 320 may be encoded using a predefined code, such as a look-up table. In this embodiment, a digital code is used to represent the information, thus potentially limiting the amount of information transmitted to another network device. For example, if information source 320 comprises a thermometer, then processor 300 could use a look-up table having 256 entries, each entry representing a unique potential temperature value. Processor 300 compares the information sent by information source 320 and matches it to the closest value in the look-up table, then constructs a data packet comprising a code related to the closest temperature value in the look-up table. In this way, the amount of transmitted data and, perhaps, the data classification or type, may conform to a required design constraint, such as those imposed by governmental authorities, for example.

Figure 4:
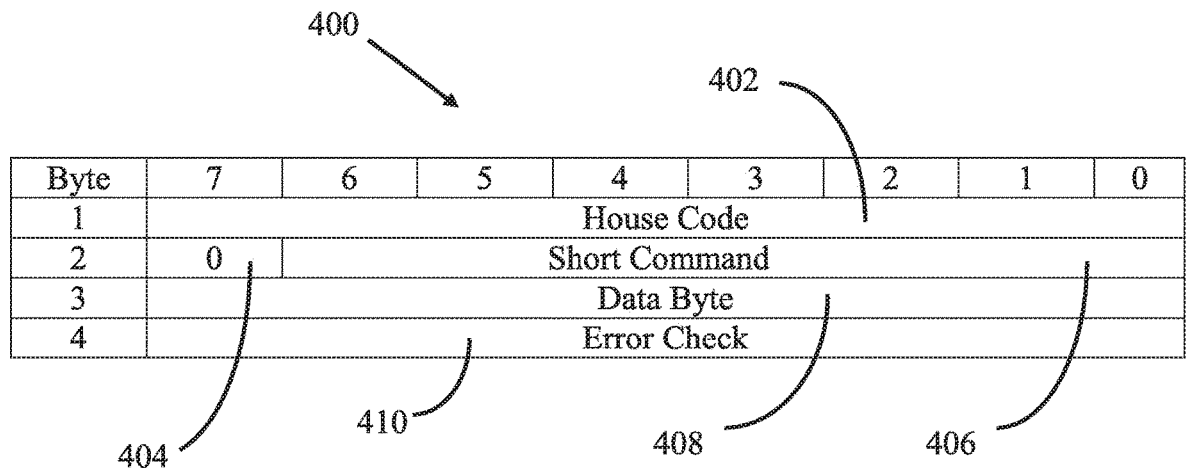
FIG. 4 is an illustration of a "short" data packet used in the system of FIG. 1.

FIG. 4 is an illustration of one embodiment of a data packet 400, referred to as a "short" data packet, used to convey information among network control device 102 and remote network devices. In one embodiment, short data packet 400 comprises 4 bytes, each byte comprising 8 bits. The size of short data packet 400 is relatively small, thereby limiting the necessary transmission bandwidth and allowing for quick transmission. Short data packet 400 typically is transmitted with a need for acknowledgement.

Short data packet 400 comprises a number of fields 402-410, each field for specifying a certain characteristic of the data packet, for example, a command, a response, information, data, error checking information, etc.

Field 402, labeled "House Code," is a network identification code, such as an address, that is generally pre-assigned to network control device 102 and remote network devices. Devices having the same house code can be thought of belonging to the same network so that they may communicate with each other. Each data packet comprises a house code that instructs network devices having the same house code to process the data packet. For example, if wired remote network device 104 and wireless remote network device 106 both are pre-assigned a house code of 0xE4, network control device 102 may communicate with both remote network devices by inserting 0xE4 into field 402. If wired remote network device 104 and wireless remote network device 106 are assigned different house codes, data packets may be sent to each device individually by inserting their respective house codes into respective data packets. Remote network devices having the same house code may also be addressed individually if some other identification information is known about each device, such as a serial number associated with each remote network device.

In general, devices in network 100 will only respond to messages sent that match their assigned house code. In one embodiment, however, devices will respond to messages sent to any house code if it is determined that a device's house code is a default house code. Alternatively, or in addition, a device will respond to a house code that is designated as a "universal" house code, i.e., a house code instructing devices to respond no matter what their assigned house code may be.

Device groups may be defined by assigning several devices to one house code and several others to another house code. Additional groups may be added as well. For example, two remote network devices could be assigned a house code of 0x3A, three other remote network devices could be assigned a house code of 0x22, and yet another remote device could be assigned a house code of 0xB1. A network control device 102 could then address the three groups individually using the house code assigned to each group.

Field 404 is one bit in length and represents whether a data packet is a "short" data packet or a "long" data packet. A long data packet is described more fully later herein.

Field 406, labeled "Short Command," is, in one embodiment, a seven bit field which represents one of 128 different pre-defined messages (i.e., commands or responses) that may be transmitted between devices in network 100. Table 1 defines twelve such predetermined short messages available in one embodiment. The term "short command" is used to denote messages used in conjunction with short data packet 400. Commands generally instruct another device to perform an action, such as to actuate a switch resulting in an electric device being turned on or off, such as a light, a pump, a fan, an air conditioner, a heater, etc., transmit an acknowledgment message, change the device's house code, report the device's house code, group number, or device type, report a status of the device or equipment associated with the device, report an operating parameter or condition associated with the device itself or a related electrical or mechanical component associated with the device, such as a mechanical or electrical parameter such as a voltage, a current, a switch status (i.e., open or closed), a temperature, a pressure, a position, etc. Responses are generally transmitted by a device in response to receiving a command, although they can be transmitted autonomously as well (an example being the transmission of a device house code at predetermined time intervals). One example of a response is an acknowledgment of receipt of a command that may, or may not, contain data associated with the acknowledgement. Often, responses contain data that was requested by a command, such as the device's house code, the status of the device, an operating parameter or condition associated with the device itself or a related electrical or mechanical component associated with the device, such as a mechanical or electrical parameter such as a voltage, a current, a switch status (i.e., open or closed), a temperature, a pressure, a position, etc. Sometimes, the difference between a command and a response is a matter of semantics. For example, a command may be defined as a message transmitted from device A to device B requesting that device B send device B's serial number to device A. A response may be defined as device B sending its serial number to device A, but also requesting an acknowledgement from device A that the serial number was received. Another response may be defined as device A transmitting an acknowledgement to device B, indicating receipt of the serial number.

TABLE 1

Short Messages

| Message | Name | Data | Description |
| --- | --- | --- | --- |
| 0x1 | HOUSE_CODE_QUERY | 0x00 | Request devices having certain house code to respond |
| 0x2 | HOUSE_CODE_RESPONSE | 0x00 | Response from devices to PLC_CMD_HOUSE_QUERY |
| 0x3 | HOUSE_CODE_SET | House Code | Set all devices in network to new house code |
| 0x4 | SERIAL_NUM_RESET | 0x00 | Reset serial number discovery flag in device |
| 0x5 | SERIAL_NUM_QUERY | 0x00 | Query all devices for current serial number |
| 0x6 | LEARN_MODE_ON | 0x00 | Devices will enter into a configuration mode used to assign devices to a group |
| 0x7 | LEARN_MODE_OFF | 0x00 | Devices will exit configuration mode |
| 0x8 | DEVICE_TYPE_QUERY | 0x00 | Request devices in given house code to respond (ACK) |
| 0x9 | DEVICE_TYPE_SN_QUERY | 0x00 | Request devices in given house code to respond |
| 0xA | GROUP_CHANGE | Group No. | Devices will enter into a configuration mode where parameter changes to devices in the given group will be stored |
| 0xB | GROUP_CHANGE_ON | Group No. | Turn given group on |
| 0xC | GROUP_CHANGE_OFF | Group No. | Turn given group off |

Field 408, labeled as "Data Byte," is, in one embodiment, an eight bit field reserved for sending information related to each particular message. Such information may comprise a house code, an operating status, a parameter, visual information, audio information, a sub-command, a serial number, a time, a date, a group number, a device type, or virtually any other type of information.

Field 410, labeled as "CRC", is an error-checking field used to determine the integrity of data packet 400 upon receipt. In one embodiment, error-checking comprises the well-known cyclic redundancy check (CRC), although in other embodiments, other error-checking methods may be used. The information contained within field 410 may be commonly referred to as a checksum.

Figure 5:
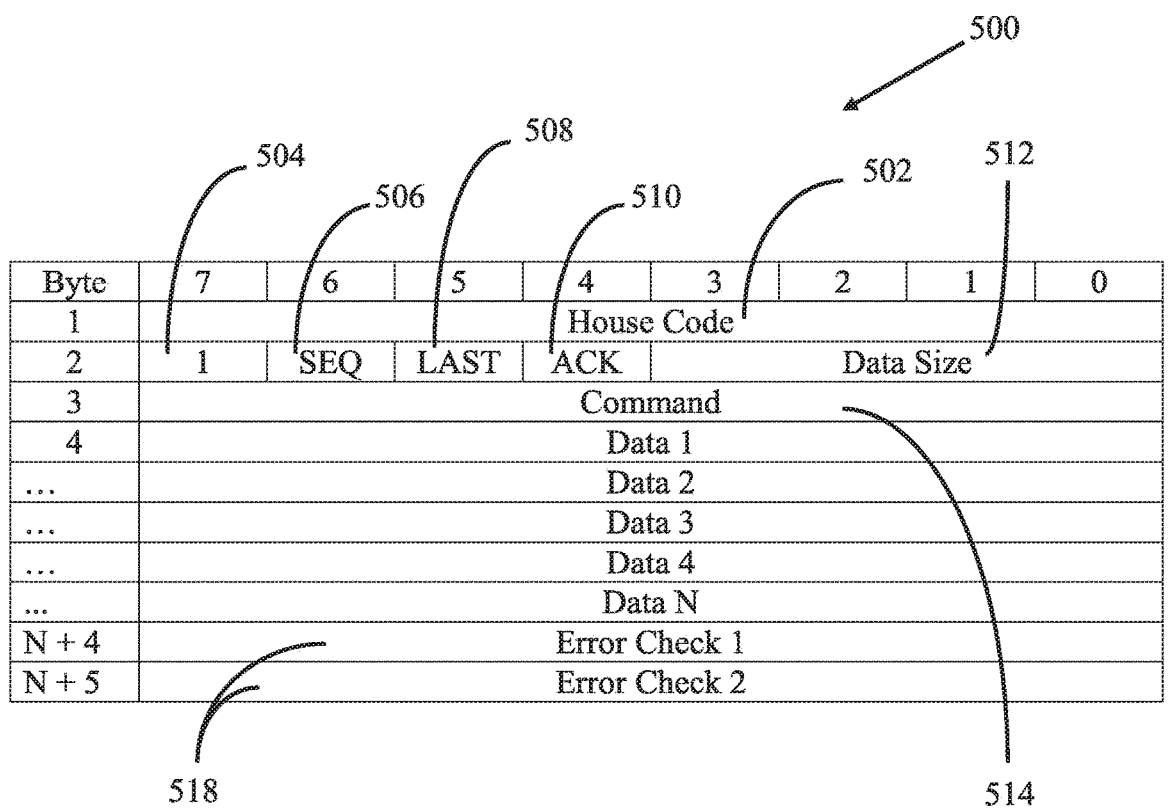
FIG. 5 is an illustration of a "long" data packet used in the system of FIG. 1.

FIG. 5 is an illustration of one embodiment of a "long" data packet 500, used to convey information among network control device 102 and remote network devices. In one embodiment, long data packet 500 comprises up to 21 bytes, each byte comprising 8 bits. The size of long data packet 500 is greater than short data packet 400, allowing for more information to be transmitted in each data packet. Long data packets typically take longer to process than short data packets, therefore it may be desirable to limit their use, such as to only use long data packets during a one-time device setup and installation.

Long data packet 500 comprises a number of fields 502-518, each field for specifying a certain characteristic of the data packet, for example, a command, a response, information, data, error checking information, etc.

Field 502, labeled "House Code," is an identification code, such as an address, that is pre-assigned to each of the remote devices in network 100. This field is similar to field 402 shown in FIG. 4 and described above.

Field 504 is similar to field 402 above, and represents whether each data packet is a "short" data packet or a "long" data packet.

Field 506, labeled "SEQ," is a one-bit field for identifying whether the data packet is part of a sequence of data packets being transmitted. In one embodiment, each data packet that is related to another data packet is assigned a "1" in the field 506. In one embodiment, the first byte in data field 516 identifies a source address of the device transmitting the sequence of data packets. In one embodiment, the source address comprises the house code of the device. Data packet sequences are used to transmit information that is too large to be placed into a single long data packet, enabling system flexibility to add additional messaging capabilities in the future.

Field 508, labeled "LAST", is a field used in conjunction with field 506, described above, to indicate that a data packet is the last data packet in a sequence of data packets. In one embodiment, field 508 comprises one bit that is set to "1" to indicate that the data packet is the last data packet in a sequence.

Field 510, labeled "ACK", is a field that generally used to acknowledge receipt of a message, (i.e., a query or command from another device on network 100). In one embodiment, field 510 is one bit long and is set to a "1" to denote that the data packet is an acknowledgement message. Typically, acknowledgement messages will not have any information placed into data field 516. In other embodiments, data packets may sometimes comprise information relating to the acknowledgement. For example, a serial number, a house code, a voltage, an RPM, a mechanical or electrical status, or virtually any other information, could be inserted into field 516 in an acknowledgement message.

Field 512, labeled "DATA SIZE", is used to denote the amount of information in field 516, for example a number of bytes. In one embodiment, field 512 is 4 bits long, allowing for 16 possible indications of data size in field 516.

Field 514, labeled "COMMAND" is, in one embodiment, an eight bit field which represents one of 256 possible pre-defined "long" messages (i.e., commands or responses) that may be transmitted among devices in network 100. Table 2 illustrates one embodiment defining nine "long" messages.

TABLE 2

Long Messages

| Message | Name | Description |
| --- | --- | --- |
| 0x0 | PING | Ping device specified device |
| 0x1 | GET_HOUSE_CODE | Get house code of specified device |
| 0x2 | SET_HOUSE_CODE | Set house code of specified device |
| 0x3 | SEND_SERIAL_NUM | Serial number of device is transmitted |
| 0x4 | GET_GROUP | Get device group number |
| 0x5 | SET_GROUP | Set device group number |
| 0x6 | PARAM_CHANGE | Change parameter of device |
| 0x7 | GET_STATUS | Get status of device |
| 0x8 | GET_TYPE | Get device type |

The term "long messages" is used to denote messages used in conjunction with long data packet 500. Commands generally instruct another device to perform an action, such as actuate a switch resulting in an electric device being turned on or off, such as a light, a pump, a fan, an air conditioner, a heater, etc., change the device's house code, report the status of the device, report an operating parameter or condition associated with the device itself or a related electrical or mechanical component associated with the device, such as a mechanical or electrical parameter such as a voltage, a current, a switch status (i.e., open or closed), a temperature, a pressure, a position, etc. Responses are generally transmitted by a device in response to receiving a command, although they can be transmitted autonomously as well (an example being the transmission of a device house code at predetermined time intervals). One example of a response is an acknowledgment of receipt of a command that may, or may not, contain data associated with the acknowledgement. Often, responses contain data that was requested by a command, such as the device's house code, the status of the device, an operating parameter or condition associated with the device itself or a related electrical or mechanical component associated with the device, such as a mechanical or electrical parameter such as a voltage, a current, a switch status (i.e., open or closed), a temperature, a pressure, a position, etc. Sometimes, the difference between a command and a response is a matter of semantics. For example, a command may be defined as a message transmitted from device A to device B requesting that device B send device B's serial number to device A. A response may be defined as device B sending its serial number to device A, but also requesting an acknowledgement from device A that the serial number was received. Another response may be defined as device A transmitting an acknowledgement to device B, indicating receipt of the serial number.

Field 516, labeled "DATA", comprises information relating to various messages. In the embodiment shown in FIG. 5, field 516 comprises multiple bytes. In one embodiment, field 516 may comprise from 1 up to 16 bytes of data. The information contained within field 516 may comprise virtually any type of data, including a device serial number, a device house code, an operating parameter or condition associated with the device itself or a related electrical or mechanical component associated with the device, such as a mechanical or electrical parameter such as a voltage, a current, a switch status (i.e., open or closed), a temperature, a pressure, a position, visual information, audio information, a sub-command, a time, a date, a group number, a device type, or virtually any other type of information Field 518 labeled as "CRC", is, in one embodiment, a two-byte error-checking field used to determine the integrity of data packet 500 upon receipt. In one embodiment, error-checking comprises the well-known cyclic redundancy check (CRC), although in other embodiments, other error-checking methods may be used. The information contained within field 518 may be commonly referred to as a checksum.

Figure 6:
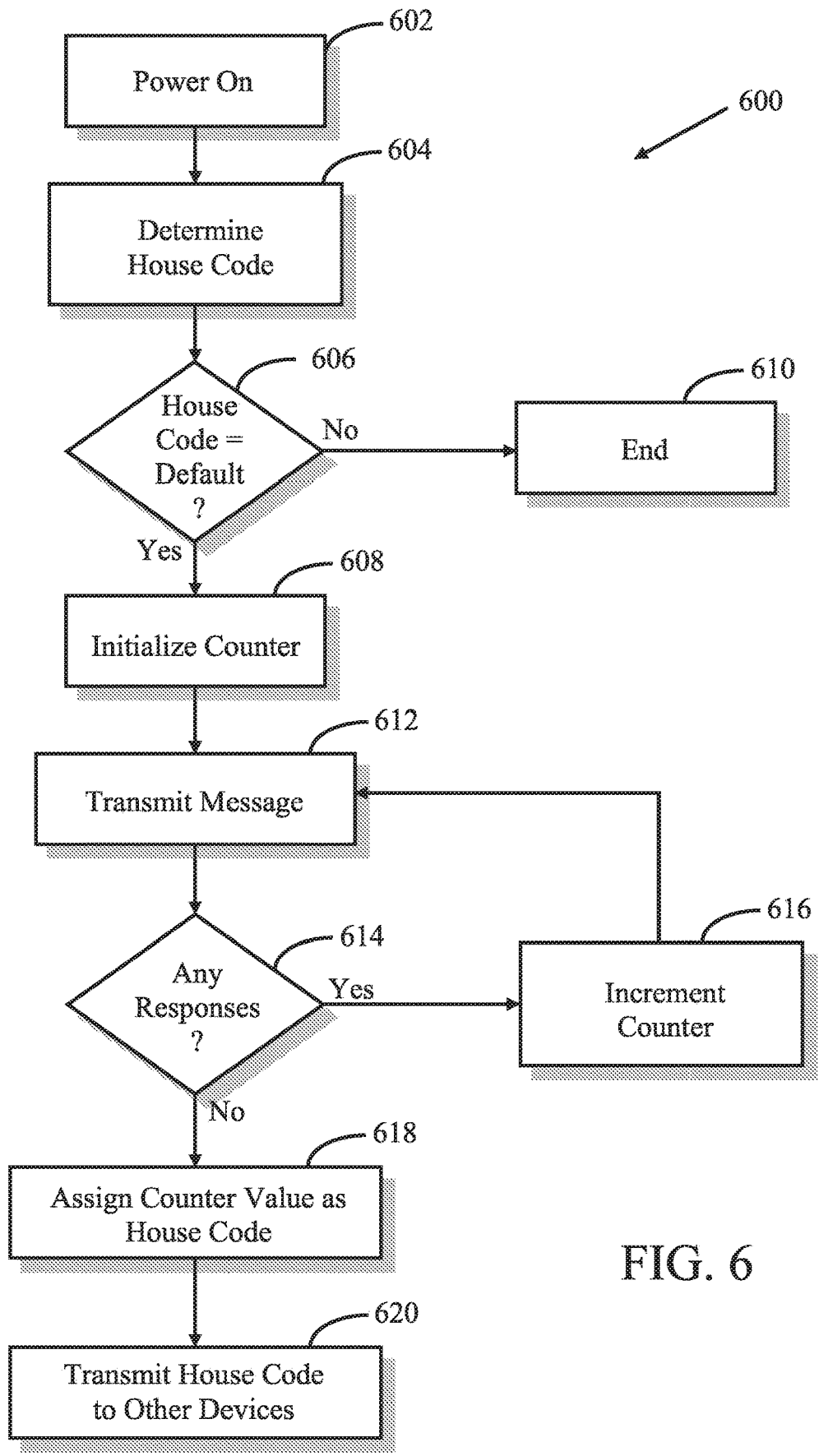
FIG. 6 is a flow diagram illustrating one embodiment of a method implemented by the network control device of FIG. 1 for using the message structures shown in FIGS. 4 and 5 to assign a house code to the network control device.

FIG. 6 is a flow diagram illustrating one embodiment of a method 600, typically implemented by network control device 102, for using the message structures described above to self-assign an initial house code or network identification code, to itself at a location, such as a home, office, or other structure or surrounding area of such locations. The process may also be implemented by wired remote network device 104 or wireless remote network device 106. As such the term "device" will be used with respect to method 600, encompassing network control device 102, wired remote network device 104, and wireless remote network device 106. As discussed previously, house codes are used to define a network of devices, each device in a network having the same house code.

Processing begins in block 602, where the device is powered on.

In block 604, a processor within the device determines a house code stored within a memory of the device.

In block 606, the processor determines whether the house code is a default house code assigned to the device, generally during the manufacturing process. In one embodiment, a default house code is predetermined to equal 0xFF. Thus, if the processor determines that the house code stored in the memory is equal to 0xFF, it is assumed that the house code is a default house code, and that the device is being initialized for the first time. Processing then continues to block 608. If the processor determines that the house code is not the predetermined, default house code, then it is assumed that the new device has been previously installed and initialized, and process 600 terminates at block 610.

In block 608, the processor initializes a counter to a predetermined number, generally to a number that corresponds to a minimum value that a house code could be assigned. In this example, the counter is set to 0x01.

In block 612, the processor generates a message to determine whether there are any other devices within range of the device. The processor then causes the transmitter to transmit the message. For example, the HOUSE_CODE_QUERY described in Table 1 could be transmitted, either over-the-air, over powerline 110, or both, as described earlier. The message comprises a house code equal to the value of the counter. The message is sent by the device, instructing any other device able to receive the message to transmit a response identifying a house code currently assigned to the responding device. For example, the HOUSE_CODE_RESPONSE described in Table 1 might be transmitted in response to another device receiving the HOUSE_CODE_QUERY message. The HOUSE_CODE_QUERY comprises the house code assigned to the responding device. After the message is transmitted, processing continues to block 614.

In block 614, the processor determines if any responses (such as the HOUSE_CODE_RESPONSE message) are received in response to transmitting the message in block 612. Messages may be received over-the-air, via powerline 110, or both, as described earlier. If a response is received, it is an indication that another device is operating with the house code transmitted in step 612 and not available for the device to use. Processing continues to block 616, where the counter is incremented. Processing then returns to block 612, where another message is transmitted to determine if any other devices are within range of the device is using a house code equal to the value of the incremented counter.

Returning to block 614, if the processor does not determine that any response has been received as a result of the message transmitted in step 612, processing continues to block 618.

In block 618, the device's house code is set to a value related to the value of the counter. In one embodiment, the device's house code is set to the value of the counter. Processing optionally proceeds to block 620.

In block 620, the processor generates a command, instructing any device capable of receiving the command to change their respective house codes to the house code identified at block 618. The processor then causes the transmitter to transmit the command. For example, the HOUSE_CODE_SET command, described in Table 1, could be used. The HOUSE_CODE_SET command comprises a data field (field 408) where the house code determined in block 618 is placed. Other devices that receive this message having a default house code will set their house code to the one in the HOUSE_CODE_SET command, either in field 408 or in field 402.

Figure 7:
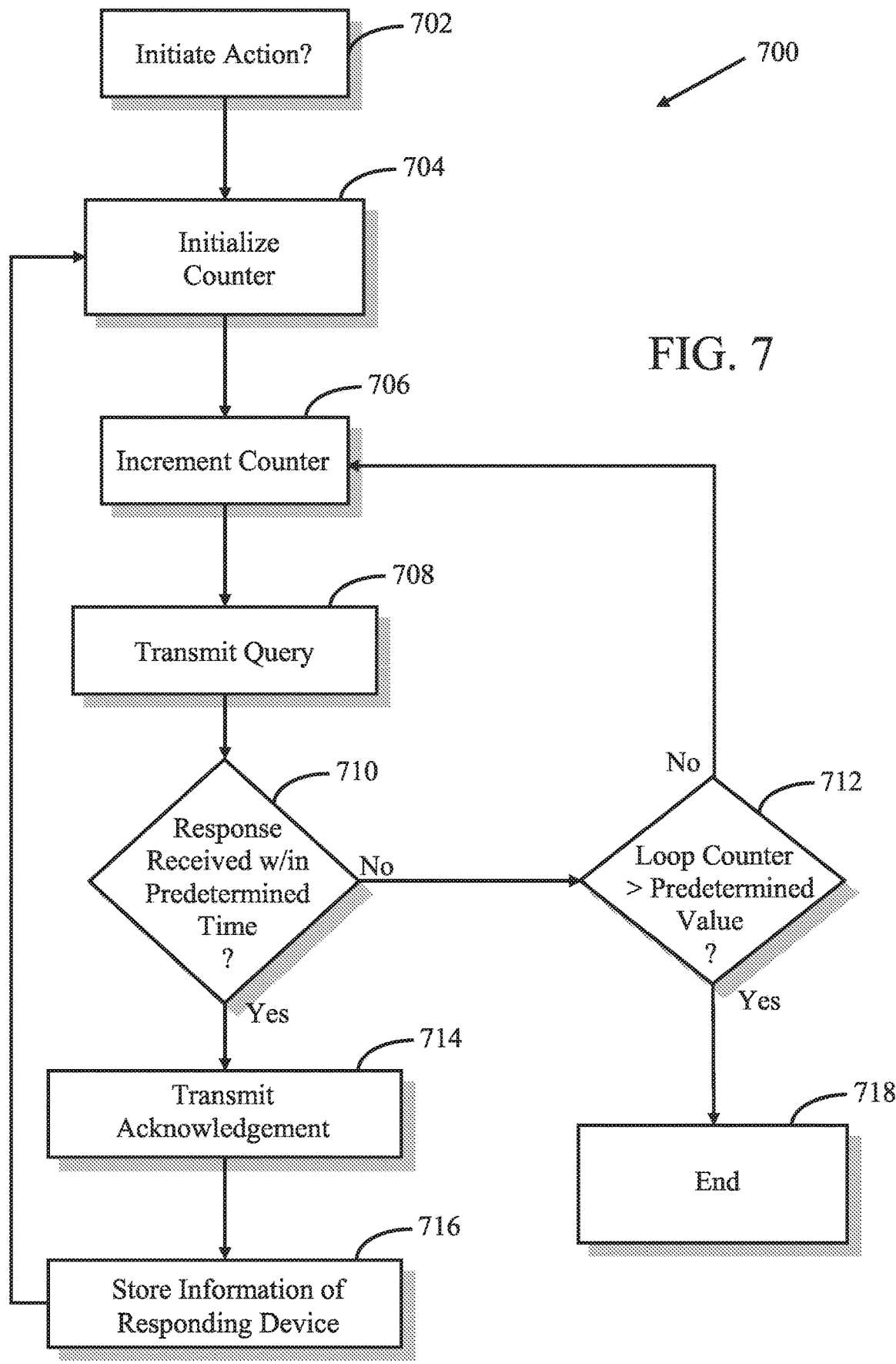
FIG. 7 is a flow diagram illustrating one embodiment of a method implemented by the network control device of FIG. 1 to discover other devices able to communicate with the network control device.

FIG. 7 is a flow diagram illustrating one embodiment of a method 700, typically implemented by network control device 102, although it could be executed by wired remote network device 104 or wireless remote network device 106 as well. As such the term "device" will be used with respect to method 700, encompassing network control device 102, wired remote network device 104, and wireless remote network device 106. Process 700 may be referred to as "device discovery."

The method beings at block 702, where, in one embodiment, a processor within the device monitors a clock to determine whether to continue processing to block 704. Executable code stored within a memory instructs the processor to continue to block 704 if the clock indicates that a predetermined time period has elapsed, such as a twelve hour time period or if the clock indicates one or more predetermined actual times.

In another embodiment, the processor determines whether a predetermined event has occurred as directed by the processor-executable instructions stored in the memory. Such a predetermined event, in one embodiment, includes receipt of a signal from another device. In other embodiments, the predetermined event is a power-up event or detection of an electrical or mechanical condition.

In still another embodiment, alternatively or in addition to the embodiments described above, the method 700 continues to block 704 if the processor is given a command to do so by a user of the device. For example, after a user installs a remote device within communication range of a network control device 102, the user may provide an indication, via a user interface such as user interface 204, for processing to proceed to block 704. In one embodiment, the indication is generated when the user initiates a predefined action, such as pressing two buttons located on the device for more than a predetermined time period, such as three seconds. When the processor detects this condition, processing continues to block 704.

In block 704, an electronic counter is initialized, using well-known techniques in either in software, hardware, or both.

Processing continues to block 706, where the counter is incremented. In another embodiment, the counter is decremented.

In another embodiment, a random house code is generated by the processor in block 704 and block 706 is omitted. This is an alternative to using a counter to generate house codes.

Processing continues to block 708, where the processor generates a message requesting any other device having a house code equal to a house code within the message respond to the request with a respective device serial number. The processor then causes the transmitter to transmit the message. For example, the SERIAL_NUM_QUERY described in Table 1 could be transmitted, either over-the-air, over powerline 110, or both, as described earlier. Each device in the network typically comprises a pre-assigned device serial number. In one embodiment, the device serial number comprises a four byte hexadecimal sequence, allowing for over four billion unique serial numbers to be assigned to devices, typically during the manufacturing process. In another embodiment, the serial number comprises a Media Access Control (MAC) address. In one embodiment, the message transmitted in block 708 comprises the house code assigned to the transmitting device, and directs any devices having the same house code to transmit their device serial number to the requesting device.

In block 710, the processor determines whether or not a response was received from another device. In one embodiment, the processor will wait for a predetermined time period after incrementing the counter before making the determination, for example, 1.5 seconds. In another embodiment, the processor waits for a longer predetermined time period, for example one minute, and if no response is received, it is assumed that no devices are active within range of the requesting device, and processing terminates at block 718.

Each of the other devices in network 100 is configured to send a response to the request transmitted in block 708 by transmitting a serial number pre-assigned to each device. For example, in one embodiment, the SEND_SERIAL_NUM command described in Table 2, above, is transmitted by each device upon receipt of the request. The SEND_SERIAL_NUM command comprises four bytes for sending the serial number of the device back to the master device.

In one embodiment, each device is configured to transmit the response a predetermined number of times in case one response "collides" with another response sent by a different device. In this way, the response message is much more likely to be received properly. The responses are typically transmitted at random times to minimize the likelihood of collisions.

Returning now back to block 710, if no response is received within the (shorter) predetermined time period, processing continues to block 712, where the value of the counter in block 706 is compared to a predetermined value stored in the memory of the master device, for example, the number 10. If the predetermined time period is equal to 1.5 seconds, and the predetermined number is 10, then the processor will have waited at least a total of 15 seconds for at least one device to respond to the request transmitted in block 708. If a greater time period is desired, either the predetermined time period can be increased, the predetermined number can be increased, or both.

If the counter value is not greater than the predetermined number, indicating that the processor has not waited long enough for at least one response to be received, processing loops back to block 706, where the counter is incremented, and blocks 708 through 712 are repeated, if necessary.

Returning to block 710 once again, if a response from another device is received within the predetermined time period after incrementing the counter, processing continues to block 714.

In block 714, the processor may generate an acknowledgement message to acknowledge receipt of the response. This message indicates that the response sent by the other device was successfully received by the requesting device. In one embodiment, the SEND_SERIAL_NUM response described in Table 2, above, is transmitted. This response message differs from the previous SEND_SERIAL_NUM command by having the ACK bit set in field 512, while no data fields 516 exist (or no data is inserted into a single data field). Upon receipt of the acknowledgement message, a device may discontinue transmitting its serial number if it has not yet transmitted all of its predetermined number of re-transmissions, described below with regard to FIG. 10.

In block 716, the processor stores the serial number contained in the message received in block 710 in the memory. Other information may be stored in association with the serial number, such as the date and/or time that the serial number was received, an indication of the type of device that sent the received message, and/or any other characteristics related to the other device. Such additional information may be contained in the response message received in block 710 or it may be transmitted in a subsequent message.

Processing then continues back to block 704, where the counter is once again initialized (or in another embodiment, a random house code is generated). Blocks 704 through 716 are then repeated until no further messages from other devices are received. At that point, the counter at block 712 will have exceeded the predetermined value, and processing will end at block 718. Thus, at the completion of method 700, the requesting device will have discovered all other devices in network 100 using the same house code as the requesting device, and a serial number corresponding to each of the discovered devices.

Figure 8A:
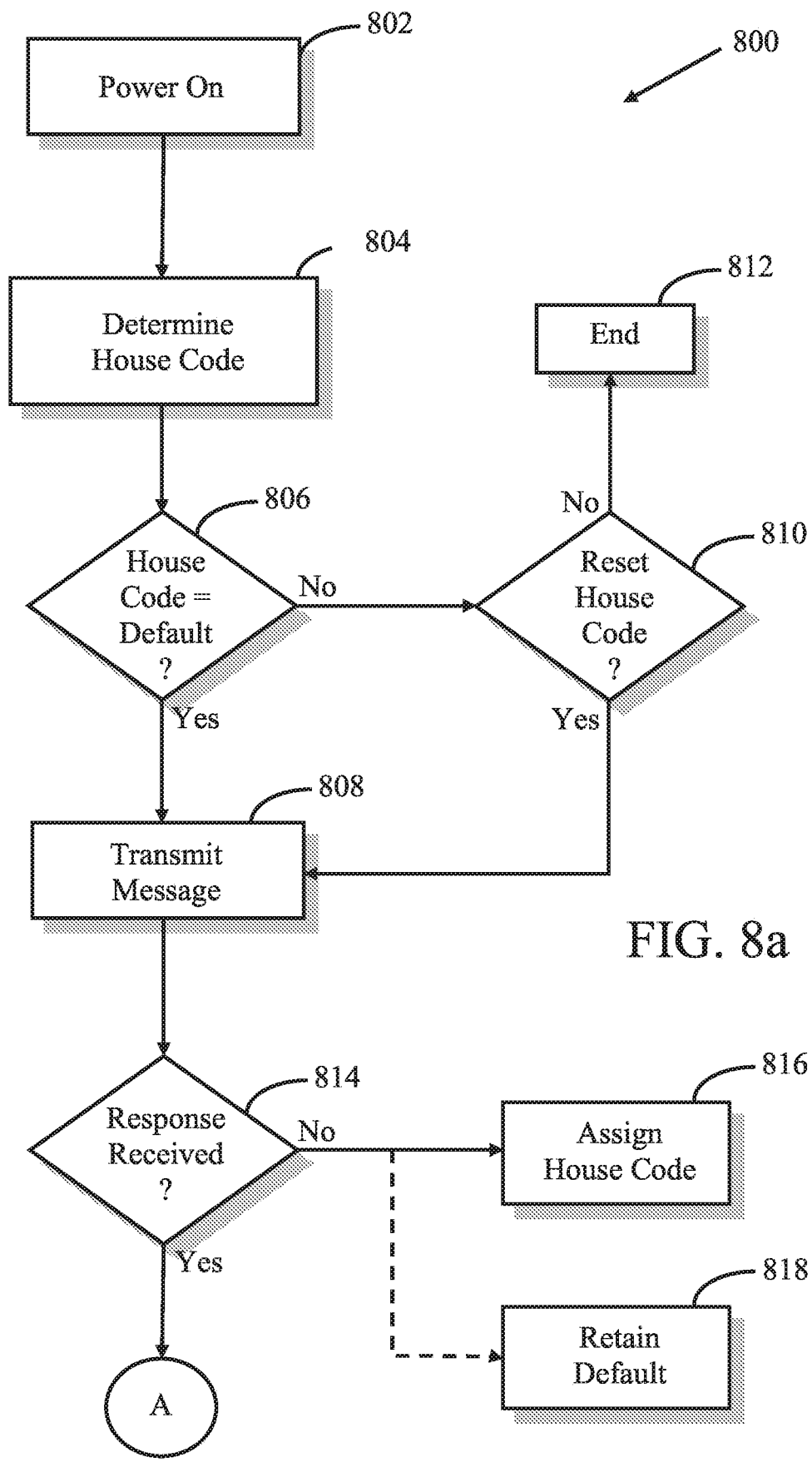
FIGS. 8*a* and 8*b* are flow diagrams illustrating one embodiment of a method implemented by either of the remote network devices of FIG. 1 to register with the network control device of FIG. 1 or another remote network device.
Figure 8B:
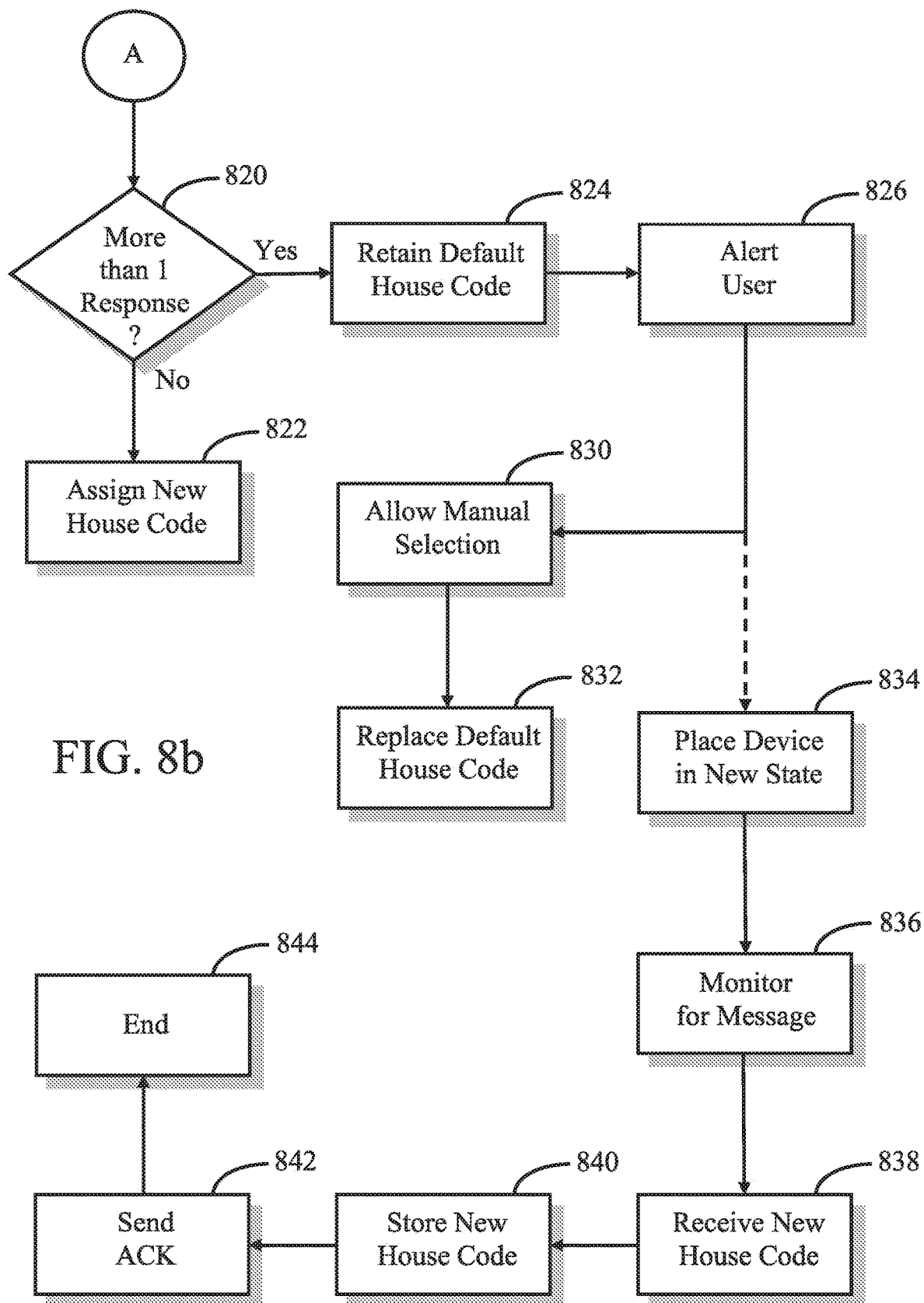

FIGS. 8a and 8b are flow diagrams illustrating one embodiment of a method 800, typically implemented by a remote network device such as wired remote network device 104 or wireless remote network device 106, for using the message structures described above to register with, or be discovered by, other devices able to communicate with the remote network device, such as network control device 102 or another remote device.

The process begins in block 802 when the remote network device is powered on.

In block 804, a processor within the remote network device determines a house code stored within a memory of the device. The house code may be provided to a display associated with the remote network device for the convenience of a user of the device.

In block 806, the processor determines whether the device house code is a default house code assigned to the device, generally during the manufacturing process. In one embodiment, a default house code is predetermined to equal 0xFF. Thus, if the processor determines that the house code stored in the memory is equal to 0xFF, then that is an indication that the device is being installed for the first time, and processing continues to step 808. If the processor determines that the house code is not the default house code, then it is assumed that the remote network device has been previously installed, and processing continues to block 810.

In block 810, the user may reset the house code. This may be desired, for example, if the remote network device was previously installed in a prior network or location and is now being installed into a new network or location. A user interface on the device will typically allow such a reset. In other embodiments, the device may comprise a switch, sensor, or electronic interface that could be used to provide a reset command to the processor. If the house code is reset, processing continues to block 808. Otherwise, processing for the method terminates at block 812, where the device retains its house code.

In block 808, the processor generates a message indicating that the remote network device seeks registration with a network control device 102 or some other remote network device. The processor causes the transmitter to transmit the message either over-the-air, over powerline 110, or both. In one embodiment, the message comprises the HOUSE_CODE_QUERY described in Table 1. This message may comprise a 0xFF house code in field 402 and/or field 408 if the message is transmitted as a short message or in field 502 and/or 516 if the message is transmitted as a long message. In the case of a long message, the device may insert its pre-assigned serial number into data field 516 for identification to other devices that receive the message. In another embodiment, a new message is defined, not shown in either Table 1 or Table 2, having a unique command that indicates that the device is new and requesting registration with a network control device 102 or some other remote network device.

In block 814, the processor determines whether a response to the transmission at block 808 has been received. If not, it is an indication that no other device is within range of the remote network device, and processing continues to step 816, where, in one embodiment, the processor assigns a random house code to the device and stores the house code in the memory. In another embodiment, if no response is received within a predetermined time period, no new house code is assigned to the device, and the device retains its default house code, as shown in block 818. An alert may be generated to indicate to a user that the device failed to register. The alert may comprise an electrical signal used to illuminate a light on the device, produce a sound from the device, and/or transmit an error message to a pre-designated telephone number or an email address.

If a response to the message sent in block 808 is received in block 814, processing proceeds to block 820, as shown in FIG. 8*b*. Messages may be received over-the-air, via powerline 110, or both, as described earlier. In one embodiment, the response comprises the HOUSE_CODE_SET message described in Table 1, instructing the device to change its default house code to one specified in the HOUSE_CODE_SET message. In other embodiments, other messages may be defined that instructs the device to change its house code to one found in the message.

In block 820, the processor determines whether any additional messages have been received in response to the message sent in block 808. This could occur if, for example, the remote network device is within range of two or more network control devices 102, where each network control device 102 transmits a message to the device in response to receiving the message sent in block 808. The processor typically waits for a predetermined time period to determine whether it has received more than one message. If no other messages are received within the predetermined time period, i.e., only one response message is received, processing proceeds to block 822, where the house code contained in the response is stored within the memory, thereby replacing the default house code with the one received in the response.

If more than one response is received at block 820, processing continues to block 824, where the default house code in the memory is retained, due to the conflict of receiving more than one response to the message transmitted in block 808. An alert may be generated in block 826, providing an indication that multiple messages were received during the initialization process.

In one embodiment, processing continues to block 830, where a manual house code selection is received from a user of the device via a user interface. The manual house code selection is an indication of which house code, selected from the received messages, the user wishes to assign to the device. Typically, the user will assign a house code relating to a house code used by a network control device 102 owned by the user. The user interface will typically display each of the received house codes, allowing the user to conveniently select one of them.

In block 832, the default house code stored in the memory is changed to the house code selected by the user.

In another embodiment, after block 826, processing proceeds to block 834, where input is received from a user, placing the device into an alternative operating mode. The alternative operating mode instructs the processor to determine when a predefined message has been received from a network control device 102.

After placing the remote network device in the alternative operating mode, the user places the network control device 102 into an operating mode whereby network control device 102 transmits a predefined message instructing the remote network device to change its house code to a house code contained within the predefined message. The predefined message transmitted by network control device 102 is a different message that what is received in block 814 and/or 820. For example, a predefined message may comprise a pre-defined command for placement in field 406, instructing any device in the alternative operating mode to change their house code to the one found in field 402. Typically, the predefined message is transmitted repeatedly until either a device responds or a time-out condition is reached.

Meanwhile, the remote network device monitors for the predefined message from the selected network control device 102 at block 836. If a predefined message is received from the selected 102, processing continues to block 838.

In block 838, the processor in the device retrieves a new house code provided in the predefined message and stores the new house code in the memory in block 840. After storing the new house code, processing continues to block 842.

In block 842, a message is generated by the processor transmitted from the remote network device to the network control device 102, instructing the network control device 102 to exit the alternative operating mode and cease transmission of the predefined message. Such a message may comprise a simple "acknowledgement" message.

The process of device registration then terminates at block 844, and the device typically exits the alternative operating mode automatically.

Figure 9:
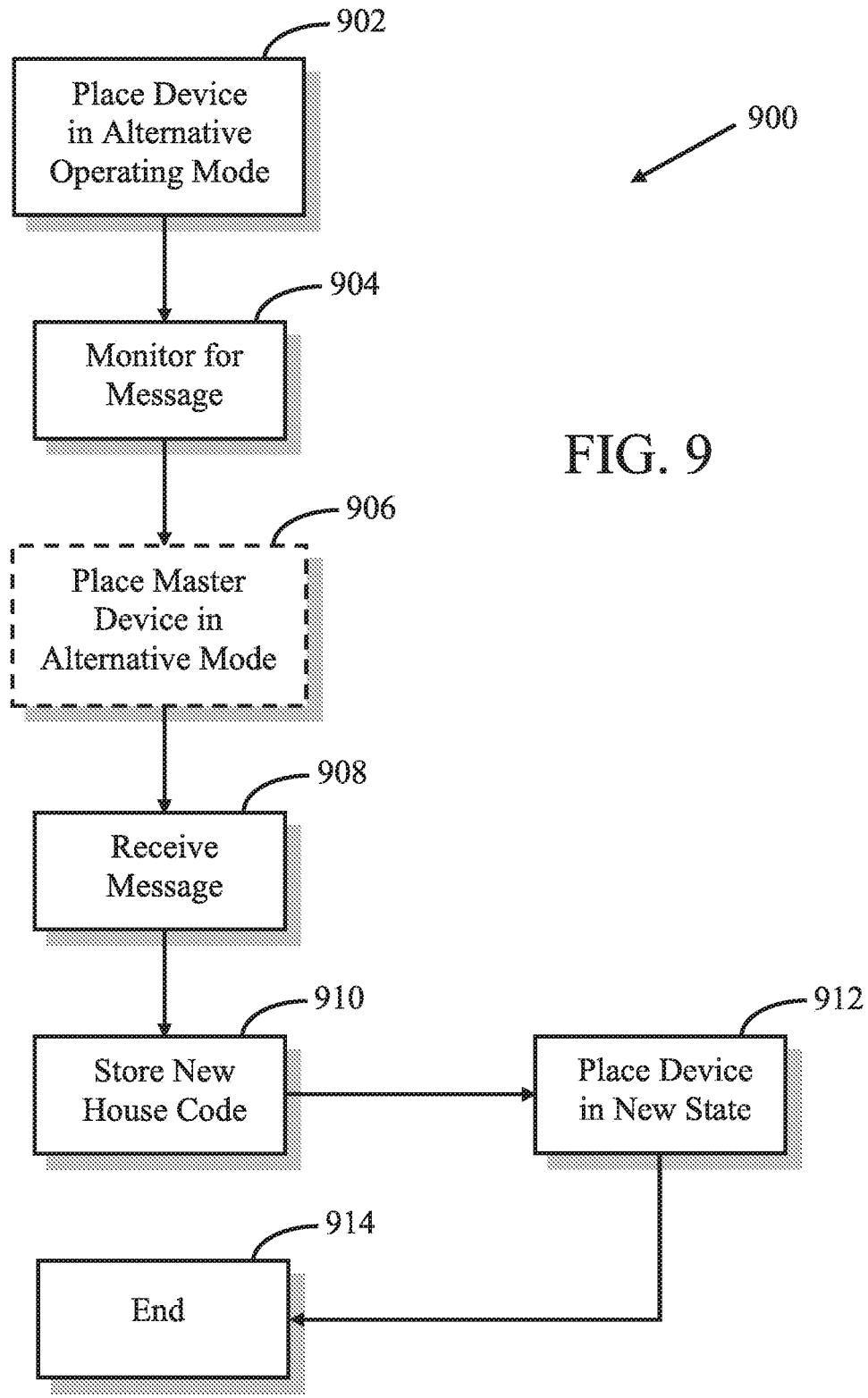
FIG. 9 is a flow diagram illustrating another embodiment of a method implemented by either of the remote network devices of FIG. 1 to register with the network control device of FIG. 1 or another remote network device.

FIG. 9 is a flow diagram illustrating one embodiment of a method 900, typically implemented by a remote network device such as wired remote network device 104 or wireless remote network device 106, for using the message structures described above to register with, or be discovered by, other devices able to communicate with the remote network device, such as network control device 102 or another remote device.

Processing begins in block 902, where input is received from a user, placing the remote network device into an alternative operating mode. The alternative operating mode instructs the processor within the remote network device to determine when a predefined message has been received from a network control device 102 or other remote network device.

In block 904, the processor monitors for receipt of the predefined message from a selected network control device 102 or other remote device. The predefined message is one that is transmitted from the selected network control device 102 or other remote network device, as explained below.

After placing the remote network device in the alternative operating mode at block 902, the user places the selected network control device 102 or other remote network device into an operating mode whereby network control device 102 or other remote network device transmits the predefined message instructing any device operating in the alternative operating mode to change its house code to a house code contained within the message (this message is not defined in either Table 1 or Table 2). For example, a predefined message may be defined comprising a unique command for placement in field 406, instructing any device in the alternative operating mode to change their house code to the one found in field 402. The predefined message is typically transmitted repeatedly.

In block 908, the predefined message sent from network control device 102 or remote network device is received by the remote network device and identified by the processor.

In block 910, the processor retrieves a new house code provided by the predefined message and stores the new house code in the memory in place of the old or default house code.

In block 912, a message is transmitted from the remote network device to the network control device 102 or other remote network device, instructing the network control device or other remote network device to exit the alternative operating mode and cease transmission of the predefined message. Such a message may comprise a simple "acknowledgement" message.

In block 914, in one embodiment, remote network device registration terminates, whereby the remote network device generally exits the alternative operating mode automatically after transmitting the message in block 912.

Figure 10:
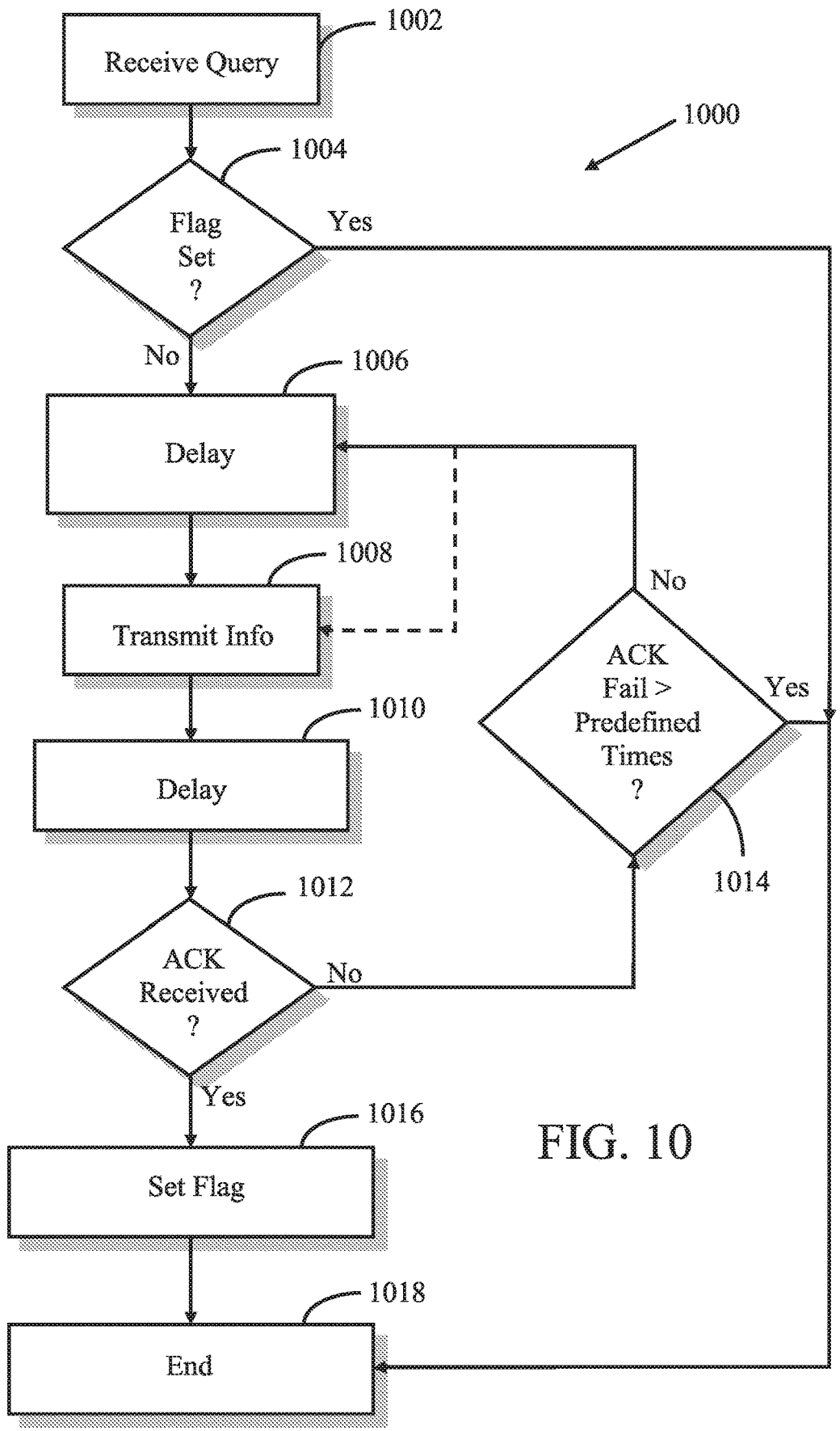
FIG. 10 is a flow diagram illustrating yet another embodiment of a method implemented by either of the remote network devices of FIG. 1 to register with the network control device of FIG. 1 or another remote network device.

FIG. 10 is a flow diagram illustrating one embodiment of a method 1000, typically implemented by a remote network device such as wired remote network device 104 or wireless remote network device 106, for using the message structures described above to register with, or be discovered by, other devices able to communicate with the remote network device, such as network control device 102 or another remote device. This process is used in conjunction with the method described with respect to FIG. 7 and is typically used after a remote network device been assigned a house code by a network control device 102 or another remote network device.

The process begins at block 1002, where the remote network device receives a message, query, or command from network control device 102, requesting that any receiving device having a particular house code respond to the message, query, or command with information identifying each particular device. For example, the identifying information may comprise a device name, a device description, a device serial number, a date and/or time relating to when the device was first powered on, when the device was first registered within network 100, or a combination of these and/or other information. In one embodiment, the message comprises the SERIAL_NUM_QUERY described in Table 1, above.

In one embodiment, only devices having an assigned house code stored in memory matching a house code within the message respond to the message received in block 1002.

After receiving the message in block 1002, processing continues to block 1004, where the processor checks to see if the remote network device has previously successfully registered with, or been discovered by, network control device 102 or another remote network device. If the remote network device has not previously successfully registered, processing continues to block 1006. If the remote network device has previously successfully registered, there is no need for the device to continue with the remainder of method 1000, so the process terminates in step 1018. The processor determines whether the remote network device has previously registered with the network control device or other remote network device by checking the memory to see if an indication has been previously stored that the remote network device has previously successfully registered. Such an indication is discussed with respect to block 1016, below.

In block 1006, processing is delayed by a randomly-generated time period. Such a randomly-generated time period may be obtained using techniques well-known in the art. The random nature of the delay provides time diversity between messages sent by multiple devices attempting to respond to the query in block 1002.

After the delay in block 1006, processing continues to block 1008, where the remote network device transmits the identifying information to the network control device 102, either over-the-air, over powerline 110, or both, as described previously.

At block 1010, processing is delayed by a predetermined time period to allow time for an acknowledgement message to be received in response to the transmission in block 1008. For example, the predetermined time period could comprise a value between half a second and 10 seconds.

In block 1012, a processor within the remote network device determines whether the acknowledgement message has been received from the network control device 102 or other remote network device in response to sending the identification information in block 1008. The acknowledgment message signifies that the network control device or other remote network device successfully received the transmitted identification information. If no acknowledgement message is received, processing continues to block 1014.

In block 1012, the processor determines whether a predetermined number of failures has occurred at block 1012, typically by using a counter to track the number of times the "No" branch has been taken and comparing that number to a predetermined number. If the number of failures at block 1012 does not exceed the predetermined number, then processing continues back to block 1006, where another random delay is determined, and blocks 1008 through 1012 are repeated. In another embodiment, processing reverts to block 1008 instead of block 1006, where the identification information is transmitted without calculating another random delay.

Back in block 1014, if the number of failures at block 1012 exceeds the predetermined number, it is an indication that the identification information is not being received by the network control device or remote network device after repeated efforts, so the remote network device stops trying to send the identification information and processing terminates at block 1018.

Back in block 1012, if an acknowledgement message is received from the network control device or other remote network device, it is an indication that the identification information transmitted in block 1008 was successfully received. In that case, processing continues to block 1016.

In block 1016, an indication is stored in the memory that the remote network device has successfully registered with the network control device or other remote network device. The indication typically comprises a flag, or bit, that is set in the memory. In one embodiment, the indication is set for a predetermined time period, for example one hour, before it is automatically cleared. The process 1000 then terminates in block 1018.

Figure 11:
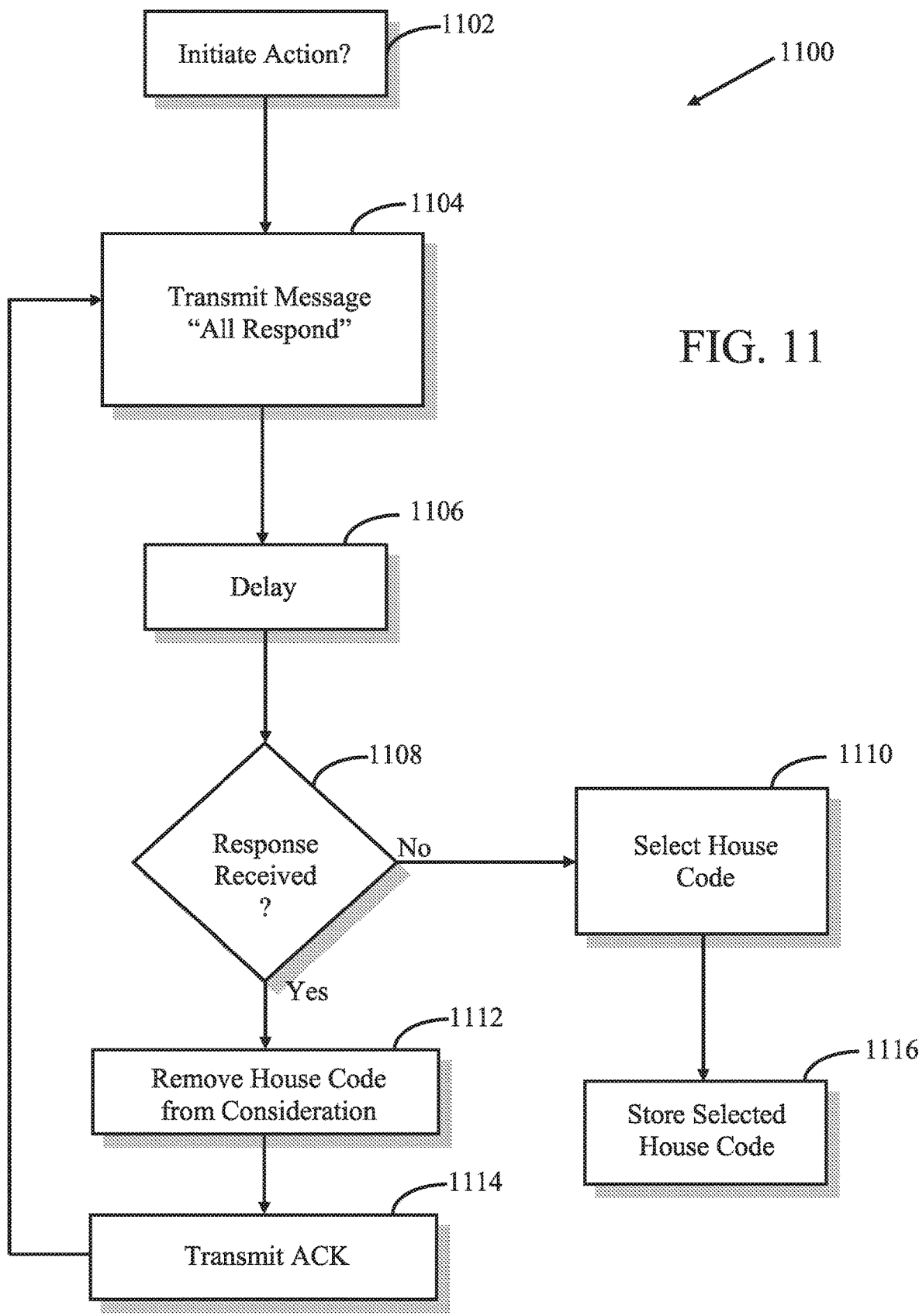
FIG. 11 is a flow diagram illustrating another embodiment of a method 1100 for self-assignment of a network code to a network device.

FIG. 11 is a flow diagram illustrating another embodiment of a method 1100, typically implemented by network control device 102, although it could be executed by wired remote network device 104 or wireless remote network device 106 as well, for self-assignment of a network code, or house code, to a network device. As such, the term "device" will be used with respect to method 1100, encompassing network control device 102, wired remote network device 104, and wireless remote network device 106.

The method beings at block 1102, where, in one embodiment, a processor within the device monitors a clock to determine whether to continue processing to block 1104.

Executable code stored within a memory instructs the processor to continue to block 1104 if the clock indicates that a predetermined time period has elapsed, such as a twelve hour time period or if the clock indicates one or more predetermined actual times.

In another embodiment, the processor determines whether a predetermined event has occurred as directed by the processor-executable instructions stored in the memory. Such a predetermined event, in one embodiment, includes receipt of a signal from another device. In other embodiments, the predetermined event is a power-up event or detection of an electrical or mechanical condition.

In still another embodiment, alternatively or in addition to the embodiments described above, the method 1100 continues to block 1104 if the processor is given a command to do so by a user of the device. For example, after a user installs a remote device within communication range of a network control device 102, the user may provide an indication, via a user interface such as user interface 204, for processing to proceed to block 1104. In one embodiment, the indication is generated when the user initiates a predefined action, such as pressing two buttons located on the device for more than a predetermined time period, such as three seconds. When the processor detects this condition, processing continues to block 1104.

In block 1104, the processor generates a message that instructs any remote device who receives it to respond with their respective house code. The processor further causes a transmitter to transmit the message, either over-the-air, over powerline 110, or both, as described earlier. Normally, remote devices will only respond to messages that comprise a house code matching their assigned house code. However, in one embodiment, one house code may be designated as a "universal" house code that instructs remote devices to take an action no matter what their pre-assigned house code may be. For example, house code 0x00 could be pre-designated as a "universal" house code, so that when a remote device receives a message comprising house code 0x00, it will respond to the message no matter what its pre-assigned house code may be.

One problem with requesting many remote devices to respond to the message transmitted in block 1104 is the potential for message collision, as responses from multiple remote devices may be received simultaneously. To combat this problem, each remote device in the network may be programmed with a different delay period for responding to either all messages or just messages designated for all remote devices to respond. In this way, messages received by the requesting device will be received at different times, allowing for successful reception of messages. In another embodiment, each remote device may be programmed to delay transmission of a response for a randomly-generated time period.

In one embodiment, remote devices respond only once to the message transmitted in block 1104 and ignore subsequently-transmitted messages for a predetermined time period after receipt of an initial message. In another embodiment, remote devices repeatedly transmit responses until an acknowledgement message is received from the requesting device.

The responses sent by remote devices each comprise a house code assigned to the particular remote device sending the response.

Referring back to FIG. 11, Processing continues to block 1106, where an optional time delay is encountered. The time delay allows a time period for remote devices to respond to the message transmitted in step 1104.

In block 1108, the processor determines whether or not one or more responses were received from at least one remote device. If one or more responses were received, processing continues to block 1112.

In block 1112, the processor removes the house code found in the received response message(s) from consideration as a potential house code for self-assignment. The processor may store the received house code(s) in the memory to accomplish this. Processing continues to block 1114.

In block 1114, the processor may generate one or more acknowledgement messages and cause the transmitter to transmit the acknowledgement message(s) back to the device that sent the response message(s). These messages indicate that the response sent by the remote device was successfully received. In one embodiment, the SEND_SERIAL_NUM response described in Table 2, above, is transmitted. The ACK bit in field 512 is set, while no data fields 516 exist (or no data is inserted into a single data field). Upon receipt of the acknowledgement message, a remote device may discontinue re-transmitting responses. Processing then continues back to block 1104, where another message is transmitted, requesting all remote devices to respond with their house code. Blocks 1104 through 1114

Back in 1108, the if no response is received, this is an indication that all remote devices within range of the message transmitted in block 1104 have transmitted a response and that they have been successfully received. In this case, processing proceeds to block 1110.

In block 1110 the processor selects a house code for self-assignment. Typically, the processor will select a house code from an available number of house codes, while omitting any house code received in step 1108 from consideration. The selected house code is then stored in the memory for use in subsequent transmissions, as shown in block 1116.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention can include a computer readable media embodying a code or processor-readable instructions to implement the methods of operation of the master device and other devices in network 100 in accordance with the methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A method for detecting remote network devices in a network, comprising:
   transmitting a registration message by a network control device requesting a response from one or more remote network devices, the registration message comprising a first network identification code that identifies a local network;
   determining by the network control device whether a response to the registration message is received within a predetermined wait-time period, the response transmitted by a first remote network device in direct response to receiving the registration message transmitted by the network control device and determining by the network control device that the first network identification code matches a second network identification code stored within the remote network device, the response comprising identification information of the remote network device;
   when the response is received within the predetermined wait-time period, re-setting by the network control device the predetermined wait-time period; and
   when the response is not received within the predetermined wait-time period, terminating by the network control device the method.

2. The method of claim 1, further comprising: when the response is received within the predetermined wait-time period, storing by the network control device the identification information associated with the first remote network device in a memory.

3. The method of claim 1, further comprising: when the response is received within the predetermined wait-time period, transmitting by the network control device an acknowledgement to the first remote network device.

4. An apparatus for detecting remote network devices in a network, comprising:
   a memory for storing processor-executable instructions, a first network identification code that identifies a local-area network, and identification information of any detected remote network devices;
   a transmitter for transmitting registration messages;
   a receiver for receiving responses from any remote network devices; and
   a processor for executing the processor-executable instructions that causes the apparatus to:
   transmit a first registration message requesting a response from one or more of the remote network devices, the registration message comprising a first network identification code;
   determine whether a response to the registration message is received within a predetermined wait-time period, the response transmitted by a first remote network device in direct response to receiving the registration message and determining that the first network identification code matches a second network identification code stored within the remote network device, the response comprising identification information of the remote network device;
   when the response is received within the predetermined wait-time period, re-set the predetermined wait-time period; and
   when the response is not received within the predetermined wait-time period, stop determining whether the response is received.

5. The apparatus of claim 4, wherein the processor-executable instructions further comprise instructions that cause the apparatus to: store the identification information associated with the first remote network device in a memory when the response is received within the predetermined wait-time period.

6. The apparatus of claim 4, wherein the processor-executable instructions further comprise instructions that cause the apparatus to: transmit an acknowledgement to the first remote network device when the response is received within the predetermined wait-time period.

7. A method, performed by a remote network device, comprising:
   receiving a registration message from a network control device, the registration message comprising a first network identification code, the network identification code for identifying a local network; and
   in direct response to receiving the registration message from the network control device performing each of determining whether the first network identification code matches a second network identification code stored within a memory of the remote network device, determining whether the remote network device has previously responded to a previously-received registration message, and transmitting a response to the registration message when the second network identification code matches the first network identification code and when the remote network device has not previously responded to the previously-received registration message.

8. The method of claim 7, wherein determining whether the remote network device has previously responded to a previously-received registration message comprises determining whether an acknowledgement message has been received prior to receipt of the registration message.

9. The method of claim 7, further comprising: setting a flag in response to transmitting the response, the flag indicative of transmission of the response.

10. The method of claim 9, wherein determining whether the remote network device has previously responded to a previously-received registration message comprises determining whether the flag is set.

11. A remote network device, comprising:
   a memory for storing processor-executable instructions, a first network identification code, and identifying information of the remote network device;
   a receiver for receiving a registration message, the registration message transmitted by a network control device, the registration message comprising a second network identification code, the second network identification code for identifying a local network; and
   a transmitter for transmitting a response to the registration message;
   a processor for executing the processor-executable instructions that cause the remote network device to respond directly to receiving the registration message from the network control device by performing each of comparing the second network identification code in the received registration method to the first network identification code, determining if the remote network device has previously responded to the network control device, and transmitting the response when the second network identification code matches the first network identification code and when the remote network device has not previously responded to the network control device.

12. The remote network device of claim 11, wherein the processor-executable instructions that cause the remote network device to determine if the remote network device has previously responded to the network control device comprises instructions that cause the remote network device to: determine whether an acknowledgement message from the network control device has previously been received.

13. The remote network device of claim 11, further comprising instructions that cause the remote network device to: set a flag in response to transmitting the response, the flag indicative of transmission of the response.

14. The remote network device of claim 13, wherein the processor-executable instructions that cause the remote network device to determine if the remote network device has previously responded to the network control device comprises instructions that cause the remote network device to determining whether the flag is set.

\* \* \* \* \*